United States Patent
Digrigoli et al.

(10) Patent No.: US 8,055,582 B2
(45) Date of Patent: Nov. 8, 2011

(54) MULTI CURRENCY EXCHANGES BETWEEN PARTICIPANTS OF A NETWORK-BASED TRANSACTION FACILITY

(75) Inventors: Giacomo Digrigoli, San Francisco, CA (US); George Lee, Mountain View, CA (US)

(73) Assignee: PayPal Inc., San Jose, CA (US)

(*) Notice: Subject to any disclaimer, the term of this patent is extended or adjusted under 35 U.S.C. 154(b) by 0 days.

(21) Appl. No.: 12/818,935

(22) Filed: Jun. 18, 2010

(65) Prior Publication Data

US 2010/0312695 A1    Dec. 9, 2010

Related U.S. Application Data

(63) Continuation of application No. 10/608,525, filed on Jun. 26, 2003, now Pat. No. 7,742,985.

(51) Int. Cl.
*G06Q 40/00* (2006.01)
(52) U.S. Cl. ............................................ 705/39; 705/30
(58) Field of Classification Search ............... 705/10–44
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 3,652,795 A | 3/1972 | Wolf et al. |
| 4,251,867 A | 2/1981 | Uchida et al. |
| 4,412,287 A | 10/1983 | Braddock, III |
| 4,674,044 A | 6/1987 | Kalmus et al. |
| 4,677,552 A | 6/1987 | Sibley, Jr. |
| 5,710,886 A | 1/1988 | Christensen et al. |
| 4,766,293 A | 8/1988 | Boston |
| 4,789,928 A | 12/1988 | Fujisaki |
| 4,799,156 A | 1/1989 | Shavit et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff |
| 4,837,422 A | 6/1989 | Dethloff et al. |

(Continued)

FOREIGN PATENT DOCUMENTS

CA    2253543 A1    3/1997

(Continued)

OTHER PUBLICATIONS

"U.S. Appl. No. 09/905,525, Advisory Action mailed May 2, 2008", 5 pgs.

(Continued)

*Primary Examiner* — Frantzy Poinvil
(74) *Attorney, Agent, or Firm* — Schwegman, Lundberg & Woessner, P.A.

(57) ABSTRACT

A method and apparatus for facilitating online payment transactions in multiple currencies between participants of a network-based transaction facility are described. In one embodiment, an exchange rate associated with a currency is stored in a database. The exchange rate is received from a third party system and is associated with a rate expiration date. One or more payment transactions conducted in the currency are also stored. A determination is made whether a determinable time period has expired, whereby the determinable time period is set to expire prior to the rate expiration date. In response to the determinable time period expiring, instructions are sent to the third party system to execute trades on the one or more payment transactions using the stored exchange rate.

20 Claims, 15 Drawing Sheets

U.S. PATENT DOCUMENTS

| | | |
|---|---|---|
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard |
| 5,056,019 A | 10/1991 | Schultz et al. |
| 5,063,507 A | 11/1991 | Lindsey et al. |
| 5,076,433 A | 12/1991 | Howes |
| 5,077,665 A | 12/1991 | Silverman et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,202,826 A | 4/1993 | McCarthy |
| 5,205,200 A | 4/1993 | Wright |
| 5,243,515 A | 9/1993 | Lee |
| 5,258,908 A | 11/1993 | Hartheimer et al. |
| 5,262,942 A | 11/1993 | Earle |
| 5,280,422 A | 1/1994 | Moe et al. |
| 5,287,268 A | 2/1994 | McCarthy |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,369,705 A | 11/1994 | Bird et al. |
| 5,375,055 A | 12/1994 | Togher et al. |
| 5,380,991 A | 1/1995 | Valencia |
| 5,394,324 A | 2/1995 | Clearwater |
| 5,401,946 A | 3/1995 | Weinblatt |
| 5,418,949 A | 5/1995 | Suzuki |
| 5,426,281 A | 6/1995 | Abecassis |
| 5,440,634 A | 8/1995 | Jones et al. |
| 5,442,782 A | 8/1995 | Malatesta et al. |
| 5,453,601 A | 9/1995 | Rosen |
| 5,455,407 A | 10/1995 | Rosen |
| 5,485,510 A | 1/1996 | Colbert |
| 5,535,276 A | 7/1996 | Ganesan |
| 5,537,314 A | 7/1996 | Kanter |
| 5,553,145 A | 9/1996 | Micali |
| 5,557,518 A | 9/1996 | Rosen |
| 5,557,728 A | 9/1996 | Garrett et al. |
| 5,596,994 A | 1/1997 | Bro |
| 5,598,557 A | 1/1997 | Doner et al. |
| 5,638,457 A | 6/1997 | Deaton |
| 5,640,569 A | 6/1997 | Miller et al. |
| 5,644,721 A | 7/1997 | Chung et al. |
| 5,657,389 A | 8/1997 | Houvener |
| 5,659,165 A | 8/1997 | Jennings et al. |
| 5,664,115 A | 9/1997 | Fraser |
| 5,671,364 A | 9/1997 | Turk |
| 5,687,323 A | 11/1997 | Hodroff |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,727,165 A | 3/1998 | Ordish et al. |
| 5,729,594 A | 3/1998 | Klingman |
| 5,734,838 A | 3/1998 | Robinson et al. |
| 5,740,252 A | 4/1998 | Minor et al. |
| 5,757,917 A | 5/1998 | Rose et al. |
| 5,761,648 A | 6/1998 | Golden et al. |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalam |
| 5,787,402 A | 7/1998 | Potter et al. |
| 5,790,790 A | 8/1998 | Smith et al. |
| 5,794,210 A | 8/1998 | Goldhaber et al. |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,855,008 A | 12/1998 | Goldhaber et al. |
| 5,857,188 A | 1/1999 | Douglas |
| 5,857,201 A | 1/1999 | Wright et al. |
| 5,857,203 A | 1/1999 | Kauffman et al. |
| 5,872,848 A | 2/1999 | Romney et al. |
| 5,873,069 A | 2/1999 | Reuhl et al. |
| 5,874,412 A | 2/1999 | Priebe et al. |
| 5,883,620 A | 3/1999 | Hobbs |
| 5,884,056 A | 3/1999 | Steele |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard |
| 5,905,974 A | 5/1999 | Fraser et al. |
| 5,905,975 A | 5/1999 | Ausubel |
| 5,909,544 A | 6/1999 | Anderson et al. |
| 5,913,203 A | 6/1999 | Wong et al. |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,945,652 A | 8/1999 | Ohki |
| 5,953,423 A | 9/1999 | Rosen |
| 5,956,694 A | 9/1999 | Powell |
| 5,960,409 A | 9/1999 | Wexler |
| 5,963,917 A | 10/1999 | Ogram |
| 5,963,923 A | 10/1999 | Garber |
| 5,969,974 A | 10/1999 | Vandenbelt et al. |
| 5,970,469 A | 10/1999 | Scroggie et al. |
| 5,971,274 A | 10/1999 | Milchman |
| 5,974,412 A | 10/1999 | Hazlehurst et al. |
| 5,983,196 A | 11/1999 | Wendkos |
| 5,987,500 A | 11/1999 | Arunachalam |
| 5,991,739 A | 11/1999 | Cupps et al. |
| 5,999,913 A | 12/1999 | Goodwin, III |
| 6,009,412 A | 12/1999 | Storey |
| 6,014,634 A | 1/2000 | Scroggie et al. |
| 6,016,955 A | 1/2000 | DeRooij et al. |
| 6,018,721 A | 1/2000 | Aziz et al. |
| 6,029,015 A | 2/2000 | Ishiguro |
| 6,029,141 A | 2/2000 | Bezos et al. |
| 6,029,150 A | 2/2000 | Kravitz |
| 6,035,280 A | 3/2000 | Christensen |
| 6,035,288 A | 3/2000 | Solomon |
| 6,035,402 A | 3/2000 | Vaeth et al. |
| 6,039,244 A | 3/2000 | Finsterwald |
| 6,044,363 A | 3/2000 | Mori et al. |
| 6,047,264 A | 4/2000 | Fisher et al. |
| 6,047,274 A | 4/2000 | Johnson |
| 6,052,670 A | 4/2000 | Johnson |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,095,410 A | 8/2000 | Andersen et al. |
| 6,101,485 A | 8/2000 | Fortenberry et al. |
| 6,104,815 A | 8/2000 | Alcorn et al. |
| 6,105,001 A | 8/2000 | Masi |
| 6,105,008 A | 8/2000 | Davis et al. |
| 6,119,137 A | 9/2000 | Smith et al. |
| 6,119,229 A | 9/2000 | Martinez et al. |
| 6,122,355 A | 9/2000 | Strohl |
| 6,138,107 A | 10/2000 | Elgamal |
| 6,161,082 A | 12/2000 | Goldberg et al. |
| 6,173,267 B1 | 1/2001 | Cairns |

| | | |
|---|---|---|
| 6,178,408 B1 | 1/2001 | Copple et al. |
| 6,192,407 B1 | 2/2001 | Smith et al. |
| 6,199,079 B1 | 3/2001 | Gupta |
| 6,202,051 B1 | 3/2001 | Woolston |
| 6,205,433 B1 | 3/2001 | Boesch et al. |
| 6,212,556 B1* | 4/2001 | Arunachalam ............... 709/219 |
| 6,237,145 B1 | 5/2001 | Narasimhan et al. |
| 6,243,691 B1 | 6/2001 | Fisher et al. |
| 6,246,996 B1 | 6/2001 | Stein et al. |
| 6,266,651 B1 | 7/2001 | Woolston |
| 6,266,652 B1 | 7/2001 | Godin et al. |
| 6,278,980 B1 | 8/2001 | Wendkos |
| 6,321,208 B1 | 11/2001 | Barnett et al. |
| 6,321,210 B1 | 11/2001 | O'Brien et al. |
| 6,330,543 B1 | 12/2001 | Kepecs |
| 6,336,009 B1 | 1/2002 | Suzumi et al. |
| 6,336,099 B1 | 1/2002 | Barnett et al. |
| 6,386,446 B1* | 5/2002 | Himmel et al. ............... 235/380 |
| 6,389,427 B1* | 5/2002 | Faulkner ....................... 707/741 |
| 6,401,077 B1 | 6/2002 | Godden et al. |
| 6,460,020 B1 | 10/2002 | Pool et al. |
| 6,490,602 B1 | 12/2002 | Kraemer et al. |
| 6,523,012 B1 | 2/2003 | Glassman et al. |
| 6,556,975 B1 | 4/2003 | Wittsche |
| 6,571,216 B1 | 5/2003 | Garg et al. |
| 6,574,239 B1 | 6/2003 | Dowling et al. |
| 6,578,012 B1 | 6/2003 | Storey |
| 6,594,640 B1 | 7/2003 | Postrel |
| 6,598,026 B1 | 7/2003 | Ojha et al. |
| 6,628,307 B1 | 9/2003 | Fair |
| 6,643,624 B2 | 11/2003 | Philippe |
| 6,721,715 B2* | 4/2004 | Nemzow ......................... 705/26 |
| 6,748,367 B1 | 6/2004 | Lee |
| 7,206,768 B1* | 4/2007 | deGroeve et al. .............. 705/54 |
| 7,398,229 B2 | 7/2008 | Budish |
| 7,599,857 B2 | 10/2009 | Bishop et al. |
| 7,660,740 B2 | 2/2010 | Barry et al. |
| 7,742,985 B1 | 6/2010 | Digrigoli et al. |
| 2001/0007099 A1 | 7/2001 | Rau |
| 2001/0009005 A1 | 7/2001 | Godin et al. |
| 2001/0011241 A1 | 8/2001 | Nemzow |
| 2001/0023407 A1 | 9/2001 | Liyanearachchi et al. |
| 2001/0027436 A1 | 10/2001 | Tenembaum |
| 2001/0029455 A1 | 10/2001 | Chin et al. |
| 2001/0032164 A1 | 10/2001 | Kim |
| 2001/0032878 A1 | 10/2001 | Tsiounis et al. |
| 2001/0034694 A1 | 10/2001 | Elias |
| 2001/0047308 A1 | 11/2001 | Kaminsky et al. |
| 2001/0049628 A1 | 12/2001 | Icho |
| 2001/0049647 A1 | 12/2001 | Sheehan et al. |
| 2002/0002538 A1 | 1/2002 | Ling |
| 2002/0013767 A1 | 1/2002 | Katz |
| 2002/0013774 A1 | 1/2002 | Morimoto |
| 2002/0026423 A1 | 2/2002 | Maritzen et al. |
| 2002/0029339 A1 | 3/2002 | Rowe |
| 2002/0038282 A1 | 3/2002 | Montgomery |
| 2002/0040344 A1 | 4/2002 | Preiser et al. |
| 2002/0046157 A1 | 4/2002 | Solomon |
| 2002/0049664 A1 | 4/2002 | Hoffman et al. |
| 2002/0069134 A1 | 6/2002 | Solomon |
| 2002/0069184 A1 | 6/2002 | Tilly et al. |
| 2002/0073015 A1 | 6/2002 | Chan et al. |
| 2002/0091580 A1 | 7/2002 | Wang |
| 2002/0099656 A1 | 7/2002 | Poh Wong |
| 2002/0111889 A1 | 8/2002 | Buxton et al. |
| 2002/0111907 A1 | 8/2002 | Ling |
| 2002/0120548 A1 | 8/2002 | Etkin |
| 2002/0120554 A1 | 8/2002 | Vega |
| 2002/0147655 A1 | 10/2002 | Say |
| 2002/0174031 A1* | 11/2002 | Weiss ............................. 705/26 |
| 2002/0174050 A1 | 11/2002 | Eynard et al. |
| 2003/0014350 A1 | 1/2003 | Duell |
| 2003/0018885 A1 | 1/2003 | Landsman et al. |
| 2003/0022719 A1 | 1/2003 | Donald et al. |
| 2003/0050861 A1 | 3/2003 | Martin |
| 2004/0039692 A1 | 2/2004 | Shields et al. |
| 2004/0049423 A1 | 3/2004 | Kawashima et al. |
| 2006/0089897 A1 | 4/2006 | Maas et al. |
| 2006/0136301 A1* | 6/2006 | Grovit ............................ 705/16 |
| 2007/0198391 A1 | 8/2007 | Dreyer et al. |
| 2008/0147479 A1* | 6/2008 | Johnson ......................... 705/10 |
| 2010/0131510 A1 | 5/2010 | Boone et al. |

FOREIGN PATENT DOCUMENTS

| | | |
|---|---|---|
| DE | 4308597 A1 | 8/1993 |
| EP | 0251619 A2 | 1/1988 |
| EP | 0254812 A2 | 2/1988 |
| EP | 0542298 A2 | 5/1993 |
| EP | 0590861 A2 | 4/1994 |
| FR | 2658635 | 8/1991 |
| GB | 2261579 A | 5/1993 |
| GB | 2296413 A | 6/1996 |
| GB | 2301919 A | 12/1996 |
| JP | 2001000469 A | 1/2001 |
| JP | 2001319098 A | 11/2001 |
| JP | 2001338179 A | 12/2001 |
| JP | 2001357248 A | 12/2001 |
| JP | 2002092390 A | 3/2002 |
| JP | 2002109286 A | 4/2002 |
| JP | 2002207898 A | 7/2002 |
| NL | 9300266 | 2/1993 |
| WO | WO-9116691 A1 | 10/1991 |
| WO | WO-9215174 A1 | 9/1992 |
| WO | WO-9512169 A1 | 5/1995 |
| WO | WO-9517711 A1 | 6/1995 |
| WO | WO-9633568 A1 | 10/1996 |
| WO | WO-9634356 A1 | 10/1996 |
| WO | WO-9636024 A1 | 11/1996 |
| WO | WO-9641315 A1 | 12/1996 |
| WO | WO-9704411 A1 | 2/1997 |
| WO | WO-9737315 A1 | 10/1997 |
| WO | WO-9743727 A1 | 11/1997 |
| WO | WO-9748078 A2 | 12/1997 |
| WO | WO-9809447 A2 | 3/1998 |
| WO | WO-9809447 A3 | 3/1998 |
| WO | WO-9960503 A1 | 11/1999 |
| WO | WO-9963461 A1 | 12/1999 |
| WO | WO-0058862 A2 | 10/2000 |
| WO | WO-0062231 A1 | 10/2000 |
| WO | WO-0079461 A1 | 12/2000 |
| WO | WO-0116815 A2 | 3/2001 |
| WO | WO-0129750 A1 | 4/2001 |
| WO | WO-0139059 A1 | 5/2001 |
| WO | WO-0152135 A1 | 7/2001 |
| WO | WO-0153929 A1 | 7/2001 |
| WO | WO-0171579 A1 | 9/2001 |
| WO | WO-0171580 A1 | 9/2001 |
| WO | WO-0173665 A1 | 10/2001 |
| WO | WO-0180111 A1 | 10/2001 |
| WO | WO-0182115 A1 | 11/2001 |
| WO | WO-0205179 A1 | 2/2002 |
| WO | WO-0231737 A1 | 4/2002 |
| WO | WO-0233618 A1 | 4/2002 |
| WO | WO-0248828 A2 | 6/2002 |
| WO | WO-03038560 A2 | 6/2002 |
| WO | WO-02069101 A2 | 9/2002 |
| WO | WO-02097582 A2 | 12/2002 |
| WO | WO-2004090666 A2 | 10/2004 |
| WO | WO-2004090666 A3 | 10/2004 |

OTHER PUBLICATIONS

"U.S. Appl. No. 09/905,525, Final Office Action mailed Jan. 10, 2008", 15 pgs.

"U.S. Appl. No. 09/905,525, Non-Final Office Action mailed Mar. 5, 2009", 25 pgs.

"U.S. Appl. No. 09/905,525, Non-Final Office Action mailed Aug. 22, 2008", 17 pgs.

"U.S. Appl. No. 09/905,525, Response filed Mar. 27, 2008 to Non Final Office Action mailed Jan. 10, 2008", 17 pgs.

"U.S. Appl. No. 09/905,525, Response filed Jun. 10, 2008 to Advisory Action mailed May 2, 2008", 20 pgs.

"U.S. Appl. No. 09/905,525, Response filed Nov. 24, 2008 to Non Final Office Action mailed Aug. 22, 2008", 17 pgs.

"U.S. Appl. No. 10/407,756, Final Office Action mailed Jan. 7, 2009", 28 pgs.

"U.S. Appl. No. 10/407,756, Non-Final Office Action mailed Jun. 27, 2008", 10 pgs.

"U.S. Appl. No. 10/407,756, Preliminary Amendment filed Nov. 3, 2003", 12 pgs.
"U.S. Appl. No. 10/407,756, Response filed Sep. 26, 2008 to Non-Final Office Action mailed Jun. 27, 2008", 17 pgs.
"U.S. Appl. No. 10/607,587, Final Office Action mailed Apr. 21, 2008", 28 pgs.
"U.S. Appl. No. 10/607,587, Non-Final Office Action mailed Nov. 30, 2007", 19 pgs.
"U.S. Appl. No. 10/607,587, Non-Final Office Action mailed Dec. 19, 2008", 31 pgs.
"U.S. Appl. No. 10/607,587, Response filed Feb. 28, 2008 to Non-Final Office Action mailed Nov. 30, 2007", 15 pgs.
"U.S. Appl. No. 10/607,587, Response filed Jun. 19, 2008 to Final Office Action mailed Apr. 21, 2008", 17 pgs.
"U.S. Appl. No. 10/607,587, Response filed Oct. 16, 2008 to Final Office Action mailed Apr. 21, 2008", 15 pgs.
"U.S. Appl. No. 10/608,525, Advisory Action mailed Sep. 8, 2009", 3 pgs.
"U.S. Appl. No. 10/608,525, Advisory Action mailed Jul. 29, 2008", 3 pgs.
"U.S. Appl. No. 10/608,525, Decision On Pre-Appeal Brief mailed Jul. 31, 2008", 2 pgs.
"U.S. Appl. No. 10/608,525, Final Office Action mailed May 1, 2008", 8 pgs.
"U.S. Appl. No. 10/608,525, Final Office Action mailed Jun. 26, 2009", 11 pgs.
"U.S. Appl. No. 10/608,525, Non-Final Office Action mailed Dec. 16, 2008", 14 pgs.
"U.S. Appl. No. 10/608,525, Non-Final Office Action mailed Sep. 11, 2007", 6 pgs.
"U.S. Appl. No. 10/608,525, Notice of Allowance mailed Feb. 8, 2010", 6 pgs.
"U.S. Appl. No. 10/608,525, Pre-Appeal Brief Request filed Sep. 28, 2009", 5 pgs.
"U.S. Appl. No. 10/608,525, Response filed Jan. 11, 2008 to Non-Final Office Action mailed Sep. 11, 2007", 15 pgs.
"U.S. Appl. No. 10/608,525, Response filed Mar. 16, 2009 to Non-Final Office Action mailed Dec. 16, 2008", 15 pgs.
"U.S. Appl. No. 10/608,525, Response filed Jul. 1, 2008 to Final Office Action mailed May 1, 2008", 15 pgs.
"U.S. Appl. No. 10/608,525, Response filed Aug. 21, 2009 to Final Office Action mailed Jun. 26, 2009", 16 pgs.
"U.S. Appl. No. 10/608,525, Response filed Oct. 16, 2008 to Final Office Action mailed May 1, 2008", 17 pgs.
"European Application Serial No. 01959319.3, Office Action mailed May 15, 2007", 3 pgs.
"OED Online Main entry text Frame", [Online]. <URL: http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>, (Apr. 14, 2008), 8 pgs.
"PSINet Teams with WorldPay Ltd. to Launch the World's First Secure Multi-Currency Solution for International Electronic Commerce", PR Newswire Association, (Oct. 6, 1997), 3 pgs.
"RSA signs deal with China", Internet Week, 2(7), (Feb. 12, 1996), 2 pgs.
Bers, Joanna Smith, "Cyberspace: The new promised land", Bank Systems & Technology, 32(7), (Jul. 1995), 32-37.
Bidnbuy, "Going, going, virtually gone . . . ", Business and Finance Dialog File 20#06012646, (Jun. 17, 1999), 3 pgs.
Chapman, Robert L, et al., "", Roget's International thesaurus fourth, Thomas Y Crowell, Publishers New York sec 637, (1997), 3 pgs.
Cohen, Jackie, "Citibank's Bid To Be The King Of Cash (Citibank unveils Electronic Monetary System prototype, a digital currency system capable of replacing all current monetary systems)", Bank Technology News, 9(9), (Sep. 1996), p. 9+.
Lassila, Ora, "Web metadata; A Matter of Semantics", IEEE Internet Computing, v2i4pg30 Proquest #1424143061, (1998), 15 pgs.
Lee, Pui-Mun, et al., "Considering exchange rate movements in economic evaluation of foreign direct investments", Engineering Economist, 40(2), (Winter, 1995), 171-199.

McDougall, Bruce, "Electronic evolution", Canadian Banker, 102(5), (Sep.-Oct. 1995), p. 28(6).
"U.S. Appl. No. 09/905,525, Non-Final Office Action mailed Aug. 22, 2008", 17 pgs.
"U.S. Appl. No. 09/905,525, Notice of Allowance mailed Sep. 18, 2009", 11 pgs.
"U.S. Appl. No. 09/905.525, Response filed Jun. 5, 2009 to Non Final Office Action mailed Mar. 5, 2009", 19 pgs.
"U.S. Appl. No. 09/905.525, Response filed Sep. 25, 2007 to Non Final Office Action mailed Jun. 25, 2007", 17 pgs.
"U.S. Appl. No. 09/905.525, Final Office Action mailed Jun. 29, 2006", 14 pgs.
"U.S. Appl. No. 09/905.525, Non Final Office Action mailed Jun. 25, 2007", 16 pgs.
"U.S. Appl. No. 09/905.525, Non Final Office Action mailed Dec. 12, 2005", 12 pgs.
"U.S. Appl. No. 09/905.525, Non Final Office Action mailed Dec.14, 2004", 11 pgs.
"U.S. Appl. No. 09/905.525, Non Final Office Action mailed Dec. 18, 2006", 15 pgs.
"U.S. Appl. No. 09/905.525, Response filed Mar. 19, 2007 to Non Final Office Action mailed Dec. 18, 2006", 9 pgs.
"U.S. Appl. No. 09/905.525, Response filed Apr. 12, 2006 to Non Final Office Action mailed Dec. 12, 2005", 8 pgs.
"U.S. Appl. No. 09/905.525, Response filed Apr. 13, 2005 to Non Final Office Action mailed Dec. 14, 2007", 17 pgs.
"U.S. Appl. No. 09/905.525, Response filed Sep. 22, 2006 to Final Office Action mailed Jun. 29, 2006", 19 pgs.
"U.S. Appl. No. 10/407,756, Advisory Action mailed Apr. 3, 2009", 3 pgs.
"U.S. Appl. No. 10/407,756, Appeal Brief filed Jul. 27, 2010", 27 pgs.
"U.S. Appl. No. 10/407,756, Decision on Pre-Appeal Brief Request mailed May 27, 2010", 2 pgs.
"U.S. Appl. No. 10/407,756, Final Office Action mailed Jan. 15, 2010", 16 pgs.
"U.S. Appl. No. 10/407,756, Non Final Office Action mailed Aug. 6, 2009", 14 pgs.
"U.S. Appl. No. 10/407,756, Non-Final Office Action mailed Jun. 27, 2008", 10 pgs.
"U.S. Appl. No. 10/407,756, Pre-Appeal Brief Request filed Apr. 15, 2010", 5 pgs.
"U.S. Appl. No. 10/407,756, Preliminary Amendment filed Nov. 3, 2003", 12 pgs.
"U.S. Appl. No. 10/407,756, Reply Brief filed Dec. 28, 2010", 3 pgs.
"U.S. Appl. No. 10/407,756, Response filed Mar. 6, 2009 to Final Office Action mailed Jan. 7, 2009", 14 pgs.
"U.S. Appl. No. 10/407,756, Response filed May 7, 2009 to Advisory Action mailed Apr. 3, 2009", 14 pgs.
"U.S. Appl. No. 10/407,756, Response filed Sep. 26, 2008 to Non-Final Office Action mailed Jun. 27, 2008", 17 pgs.
"U.S. Appl. No. 10/407,756, Response filed Nov. 6, 2009 to Non Final Office Action mailed Aug. 6, 2009", 14 pgs.
"U.S. Appl. No. 10/607,587, Advisory Action mailed Jul. 2, 20008", 2 pgs.
"U.S. Appl. No. 10/607,587, Advisory Action mailed Sep. 11, 2009", 2 pgs.
"U.S. Appl. No. 10/607,587, Appeal Brief filed Dec. 9, 2009", 27 pgs.
"U.S. Appl. No. 10/607,587, Examiner's Answer received Feb. 4, 2010 to Appeal Brief filed Dec. 9, 2009", 29 pgs.
"U.S. Appl. No. 10/607,587, Final Office Action mailed Apr. 21, 2008", 28 pgs.
"U.S. Appl. No. 10/607,587, Final Office Action mailed Jun. 23, 2009", 11 pgs.
"U.S. Appl. No. 10/607,587, Pre-Appeal Brief Request filed Sep. 23, 2009", 5 pgs.
"U.S. Appl. No. 10/607,587, Response filed Mar. 19, 2009 to Non Final Office Action mailed Dec. 19, 2008", 12 pgs.
"U.S. Appl. No. 10/607,587, Response filed Aug. 21, 2009 to Final Office Action mailed Jun. 23, 2009", 13 pgs.
"U.S. Appl. No. 10/608,525, Decision on Pre-Appeal Brief Request mailed Sep. 12, 2008", 2 pgs.
"U.S. Appl. No. 10/608,525, Decision on Pre-Appeal Brief Request mailed Nov. 17, 2009", 2 pgs.

"U.S. Appl. No. 11/641,262, Advisory Action mailed Oct. 21, 2010", 3 pgs.

"U.S. Appl. No. 11/641,262, Decision on Pre-Appeal Brief Request mailed Dec. 6, 2010", 2 pgs.

"U.S. Appl. No. 11/641,262, Final Office Action mailed Aug. 5, 2010", 12 pgs.

"U.S. Appl. No. 11/641,262, Non-Final Office Action mailed Mar. 11, 2010", 16 pgs.

"U.S. Appl. No. 11/641,262, Pre-Appeal Brief Request filed Nov. 5, 2010", 5 pgs.

"U.S. Appl. No. 11/641,262, Response filed Jun. 11, 2010 to Non Final Office Action mailed Mar. 11, 2010", 18 pgs.

"U.S. Appl. No. 11/641,262, Response filed Oct. 5, 2010 to Final Office Action mailed Aug. 5, 2010", 15 pgs.

"BarterBee.com: Buy, Sell, Why Points?", [Online]. Retrieved from the Internet: <URL: http://www.barterbee.com/xmain0003/?_hp=trade>, (Copyright 1948-2004), 1 pg.

"BarterBee.com: Help & FAQ", [Online]. Retrieved from the Internet: <URL: http://www.barterbee.com/xmain0005/?_hp=faq_4_requesting>, (Copyright 1948-2004), 2 pgs.

"BarterBee.com: Points Q & A", [Online]. Retrieved from the Internet: <URL: Http://www.barterbee.com/xmain0003/?_hp=point>, (Copyright 1948-2004), 1pg.

"Chinese Application Serial No. 200480015567.0, Office Action mailed Feb. 12, 2010", 3 Pgs.

"Ebay—Your Personal Trading Community", [Online]. Retrieved from the Internet: <URL: http://web.archive.org/web/19991007062815/www.ebay.com>, (Oct. 1999), 23 pgs.

"European Application Serial No. 01959319.3, Response filed Nov. 23, 2007 to Office Action mailed May 15, 2007", 23 pgs.

"International Application Serial No. PCT/US01/23854, International Preliminary Examination Report mailed Aug. 19, 2002", 3 pgs.

"International Application Serial No. PCT/US01/23854, International Search Report mailed Dec. 28, 2001", 3 pgs.

"International Application Serial No. PCT/US04/10084, International Search Report and Written Opinion mailed Mar. 17, 2005", 18 Pages.

"New eBay-like auction software released", Business Wire, Business Editors/High-Tech Writers; Business Wire; New York, (Mar. 17, 1999), 2 pp.

"Peerflix: How it Works", [Online]. Retrieved from the Internet: <URL: http://www.peerflix.com/Default.aspx?tabid=64>, (Copyright 2004-2006), 2 pgs.

"Peerflix: Netflix, Blockbuster and Peerflix: Compare Online Dvd Rentals vs. Buying vs. Trading", [Online]. Retrieved from the Internet: <URL: http://www.peerflix.com/Default.aspx?tabid=171>, (Copyright 2004-2006), 2 pgs.

"Yahoo Homepage", Internet Archive Wayback Machine, http://web.archive.org/web/19991003015603/http://www.yahoo.com/index.html, (Oct. 3, 1999), 1 p.

"Yahoo!—Regional:Countries:Afghanistan", [Online]. Retrieved from the Internet: <URL: http://web.archive.org/web/20060921181441/ http://dir.yahoo.com/Regional/countries/afghanistan>, (Jun. 16, 1997), 1 pg.

"Yahoo!—Regional:Countries:Sweden", [Online]. Retrieved from the Internet: <URL: http://web.archive.org/web/19970616194441/www.yahoo.com/Regional/Countries/Sweden/ >, (Jun. 16, 1997), 2 pgs.

Asbrand, Deborah, "Taking Stock in Trading Exchanges", [Online]. Retrieved from the Internet: <URL: http://www.reed-electronics.com/eb-mag/index.asp?layout=articlePrint&articleID=CA42124>, (Apr. 1, 2000), 5 pgs.

Baumann, G. W, "Personal Optimized Decision/Transaction Program", IBM Technical Disclosure Bulletin, (Jan. 1995), 83-84.

Business Wire, "Subasta.com Enters Into Strategic Partnership with From2.com", Business Wire, Obtained from Proquest, Document No. 43206061, (Jul. 16, 1999), 2 pages.

Business Wire, "Yahoo! Launches Three New European Auctions Services; Yahoo! Italy, Yahoo! Spain and Yahoo! Sweden Unveil New Local Auctions", Business Wire, Obtained from Proquest, Document No. 45061209, (Sep. 23, 1999), 3 pages.

Chan, H C.B, et al., "Design and implementation of a mobile agent-based auction system", Communications, Computers and signal Processing, 2001. PACRIM. 2001 IEEE Pacific Rim Conference on, volume: 2, (Aug. 26-28, 2001), 740-743.

Chen, Jian, "Bidder's strategy under group-buying auction on the Internet", Systems, Man and Cybernetics, Part A, IEEE Transactions on , vol. 32 Issue: 6, (Nov. 2002), 680-690.

Clemons, E, "Evaluating the prospects for alternative electronic securities", Proceedings of ICIS 91: 12th International Conference on Information Systems, (Dec. 16-18, 1991), 53-61.

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.

Creed, Adam, "Haggling Online in the Philippines—Magtawaran Auction site—Company Business and Marketing—Brief Article", Newsbytes News Network, http://www.findarticles.com/p/articles/mi_m0NEW/is_2000_May_1/ai_61859593, (May 1, 2000), Web Page.

Dalton, Gary, "Going, Going, Gone!—E-commerce is leading to an anything-goes environment of online bidding and dynamic pricing", Information Week, http://www.informationweek.com/755/auction.htm, (Oct. 4, 1999), 4 pages.

Davidow, Emily, "The dynamics of pricing", Home Textiles Today, (Feb. 2000), pg. 42.

Edwards, Mark, "Your Web Browser is Bugged", Windows IT Pro, http://www.windowsitpro.com/WindowsSecurity/Article/ArticleID/9543/WindowsSecurity_954 3.html, (Jul. 13, 2000), 3 pages.

Edwards, Morris, "New B2B player spreads benefits of e-commerce", Communications News, (Jan. 2001), 4 pages.

Fisher, Dennis, "More Goods on the Block", EWeek, (Dec. 2000), 4 pages.

Franse, Karen, "Distribution Briefs—Are Auctions In Vogue?", Var Business, http://www.varbusiness.com/sections/strategy/strategy.jhtml?articleld=18828086, (Mar. 11, 2002), 2 pages.

Goldsborough, Reid, "Internet Auctions Examined", Link-Up, 17, (Nov./Dec. 2000), p. 24.

Goldstein, D E, "Medical E-procurement-navigating in a B2B Marker", Health Management Technology, 21(8), (Aug. 2000), 30-6.

Greengard, Samuel, "What Traffic Will Bear", BusinessFinanceMag.com, http://www.businessfinancemag.com/magazine/archives/article.html?articleID=13725, (Mar. 2001), 4 pages.

Gupta, Pankaj, "Most Flexible FF?", Google Groups, (Oct. 29, 1996), 2 pages.

Hess, C M, et al., "Computerized Loan Organization System: An Industry Case Study of the Electronic Markets Hypothesis", MIS Quarterly, vol. 18(3), (Sep. 1994), 251-274.

Jaroneczyk, Jennifer, "Sold on an Old Idea", Internet World Magazine, (Feb. 15, 2001), 3 pages.

Kalin, Sari, "Mar. 2001", Darwin, http://www.darwinmag.com/read/040101/low.html, (Apr. 2001), 5 pages.

Klein, Stefan, "Introduction to Electronic Auctions", Focus Theme, vol. 7, No. 4, (1997), 1-4.

Kumar, Manoj, et al., "Sales Promotions on the Internet", Proceedings of the Usenix Conference on E-commerce, (1998), 1-11.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Lindsay, Jeff, et al., "The Historic Use of Computerized Tools for Marketing and Market Research: A Brief Survey", Published as Document 6359D at IP.com, (Dec. 27, 2001), 20 pages.

M2 Presswire, "HP completes online strategy with launch of e-commerce site", Proquest#43225990, (Jun. 29, 1999), 3 pgs.

Malone, T., et al., "Electronic Markets and Electronic Hierarchies", Communications of the ACM, 14(25), (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

McClenahen, John, "Net Gains", Industry Week, Proquest # 41808971,., (May 17, 1999), 8 pgs.

McKendrick, Joseph, "Old Economy Players Step Up", EC World, (Nov. 2000), 35-44.

Meade, J., "Visual 360: A Performance Appraisal System That's 'Fun'", HR Magazine, Society for Human Resource Management., (Jul. 1999), 3 pgs.

Merlino, Laurel, "Auction Anxiety", Upside Today, (Oct. 2000), 247-251.

Mitchell, Lori, "BayBuilder delivers easy, profitable reverse auctions", Infoworld, http://www.infoworld.com/articles/eu/xml/00/06/05/000605eubaybuilder.html, (Jun. 2, 2000), 6 pages.

Mollison, Caitlin, "America West Airlines opt for reverse auctions", Internet World, 8(4), (Apr. 1, 2002), 42(3).

Mollman, Steve, "Are you ready to bicker over the price of that sandwich? In the new economy you won't pay retail for anything.", PC/Computing, (Jan. 1, 2000), 8-10.

Morgan, Lisa, "Pick Your Lot: Build consumer-oriented auctions with AuctionBuilder", Internet Week, (Sep. 18, 2000), 4 pages.

Neo, B S, "The implementation of an electronic market for pig trading in Singapore", Journal of Strategic Information Systems; vol. 1(5), (Dec. 1992), 278-288.

Ohlson, Kathleen, "Looking behind, beyond B2B marketplace woes", Network World Fusion, http://www.nwfusion.com/archive/2001/119669_06-11-2001.html, (Jun. 11, 2001), 4 pages.

Patel, Jeetu, et al., "New Platform Options Fuel E-Commerce", Information Week, http://www.informationweek.com/779/ecommerce.htm, (Mar. 27, 2000), 3 Pages.

Piccinelli, G, et al., "e-service composition: supporting dynamic definition of process-oriented negotiation parameters", 12th International Workshop on Database and Expert Systems Applications, 2001. Proceedings., (Sep. 3-7 , 2001), 727-731.

Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.

Post, D L, et al., "Application of auctions as a pricing mechanism for the interchange of electric power", IEEE Transactions on Power Systems, 10(3), (Aug. 1995), 1580-1584.

PR Newswire Europe Ltd., "Mitsubishi Venture, Wells Fargo Partner To Offer Multi-Currency E-Commerce Storefront", PR Newswire, Obtained from Proquest, Document No. 39345965, (Mar. 1, 1999), 3 pages.

Preist, Chris, et al., "Adaptive Agents in a Persistent Shout Double Auction", International Conference on Information and Computation Economies, Proceedings of the first international conference on Information and computation economies, (1999), 11-18.

Pressler, Margaret, "Sells on eBay; Housewife finds herself head of multinational software firm", Washington Post, Proquest # 44484325, (Sep. 5, 1999), 3 pgs.

Queree, Anne, "Bid it Out", Global Finance, (Jan. 2000), 36-37.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T E, et al., "Design of an Internet-based system for remote Dutch auctions", Internet Research: Electronic Networking Applications and Policy, vol. 5(4), (Jan. 1, 1995), 10-16.

Schmid, B F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Strassmann, Paul, "The Impact of B2B", Computerworld, (Oct. 2, 2000), 3 pages.

Tapscott, D., "eBay endagners traditional papers auctioneer can pack far more punch in your sales pitch", National Post, Proquest# 54945579, (Oct. 9, 1999), 3 pgs.

Turban, Efraim, "Auctions and Bidding on the Internet: An Assessment", Focus Theme, EM—Electronic Markets, vol. 7, No. 4, (1997), 7-11.

Turek, Norbert, "Online Portals Offer Bandwidth And Voice Services", Information Week, http://www.informationweek.com/784/bandwidth.htm, (May 1, 2000), 4 pages.

Warbelow, A, et al., "Aucnet: TV Auction Network System", Harvard Business School Case/Study, HBVR#9-190-001, USA, (Jul. 1989), 1-15.

Weiss, Scott, "Pan-Am FF Program", Google Groups, (Oct. 16, 1996), 3 pages.

Wilson, D., "Going . . . Going . . . Gone!Bargain-hunters and collectors can scour auctions from home via the internet", The Gazette, Proquest #4116732, (Apr. 27, 1999), 4 pgs.

Wilson, T., "Act Globally, Think Locally", InternetWeek, Issue 789, Obtained from Proquest, Document No. 46352181, (Nov. 15, 1999), 4 p.

Wilson, Tim, "B2B Sellers Fight Back On Pricing", InternetWeek.com, http://www.internetweek.com/lead/lead121200.htm, (Dec. 12, 2000), 3 pages.

Zwass, V., "Electronic Commerce: Structures and Issues", International Journal of Electronic Commerce, Fall 1996, vol. 1, No. 1, (Fall 1996), 3-23.

* cited by examiner

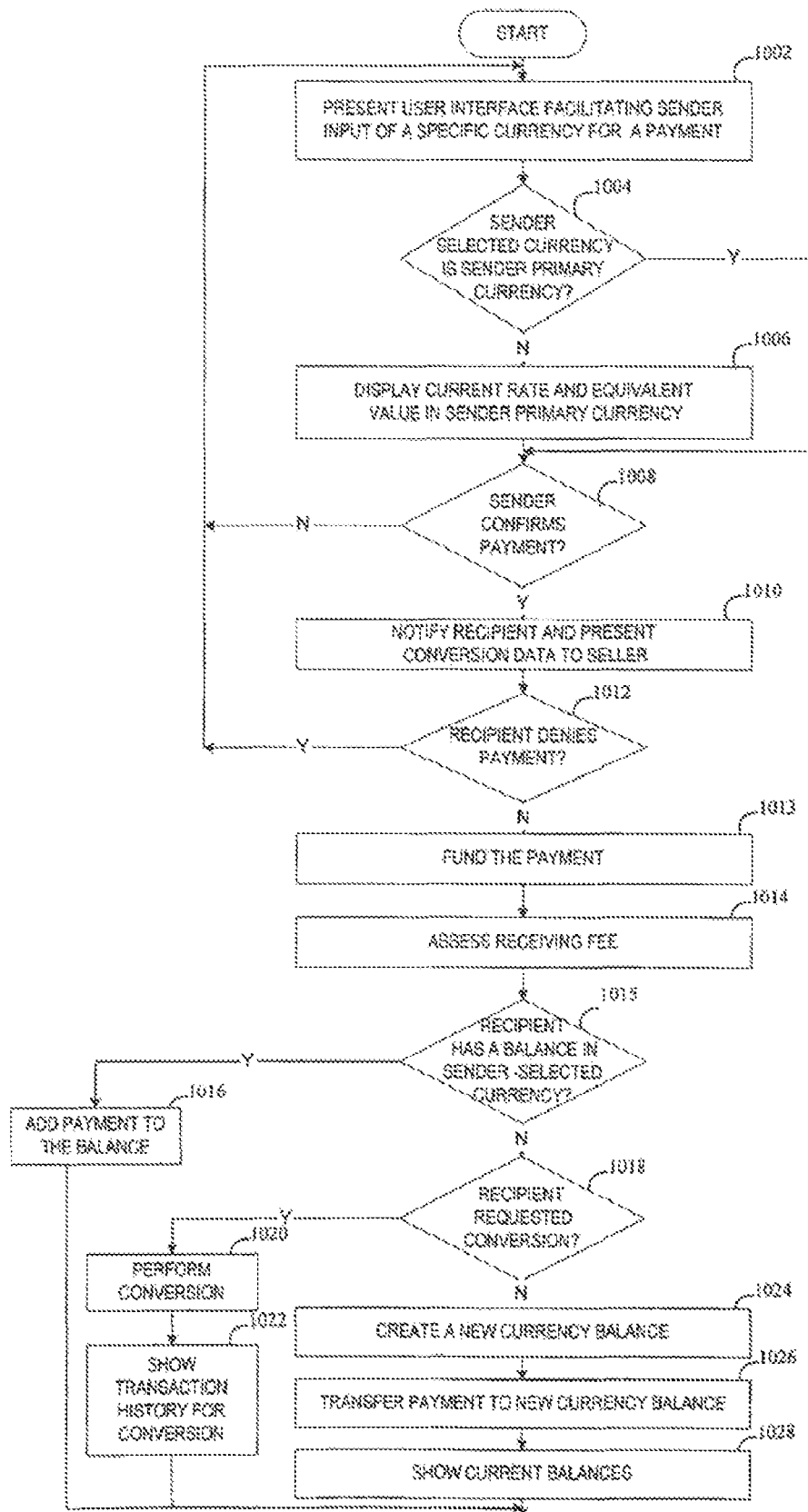

| MY ACCOUNT | SEND MONEY | REQUEST MONEY | ME

SEND MONEY

PAY ANYONE WITH AN EMAIL ADDRESS - EVEN IF THEY DON'T HAVE

RECIPIENT'S EMAIL: JEEVES@BRIFISHTEAS.CO.UK   TRY

— OR — SELECT A RECIPIENT ▼

AMOUNT: 25

1102 — • CURRENCY: U.S. DOLLARS ▼ ?

TYPE: U.S. DOLLARS ▼ ?
CANADIAN DOLLARS
SUBJECT: EUROS
(OPTIONAL) PRODUCT SEARCH (?)
YEN
NOTE:
(OPTIONAL)

*Fig. 11*

CHECK PAYMENT DETAILS                               SECURE TRANSACTION

PAYMENT DETAILS
    PAY TO: JEEVES@BRIFISHTEAS.CO.UK
    USER STATUS: VERIFIED BUSINESS MEMBER (4)
    TYPE: SERVICE
    AMOUNT: €25.00
1202 —• TOTAL AMOUNT: €25.00 (EQUAL TO $39.16)
------------------------------------------------
SOURCE OF FUNDS
    U.S. DOLLAR BALANCE: $39.16
    MORE FUNDING OPTIONS

1204 —• EXCHANGE RATE AS OF SEP.29, 2002:
               1 U.S. DOLLAR = 0.638405 POUNDS STERLING
------------------------------------------------
SHIPPING INFORMATION
• SHIP TO  1006 ALMANOR AVE, ANDNIO PARK, CA 94025, USA (CONFIRMED) ▼  ADD ADDRESS
○ NO SHIPPING ADDRESS REQUIRED
------------------------------------------------
        [SEND MONEY]  [EDIT]  [CANCEL]

*Fig. 12*

```
RECENT ACTIVITY | ALL ACTIVITY | MY AUCTIONS    HELP
[FILE] [TYPE] [TO/FROM] [NAME/EMAIL] [ AMOUNT ] [   DATE   ] [ STATUS  ] [ ACTION  ]
[ ]  |PAYMENT|FROM    |MEDOWARE  |EUR 50.00 |SEP 29, 2002 |PROCLAIMED|(ACCEPT)(DENY)|
[FILE SELECTED ITEMS]  [FILE ALL]
```

```
                [MY ACCOUNT][SEND MONEY][REQUEST MONEY][MERCHANT TOOLS][AUCTION TOOLS]

ACCEPT OR DENY A PAYMENT            ─1304

YOU HAVE RECEIVED A PAYMENT OF €50.00 EUROS FROM MEDOWARE, VERIFIED BUSINESS
MEMBER (6). WHAT WOULD YOU LIKE TO DO WITH THIS PAYMENT?

O ACCEPT THIS PAYMENT, CONVERT IT TO $47.33 U.S. DOLLARS, AND TRANSFER IT TO MY
    U.S. DOLLAR BALANCE.                     ─1304
  O ACCEPT THIS PAYMENT IN EUROS AND CREATE A EURO BALANCE IN MY PAYPAL ACCOUNT
  O DENY THIS PAYMENT

[SUBMIT]  [CANCEL]
```

*Fig. 13*

```
PREMIER ACCOUNT OVERVIEW
NAME: SERAPHNE KOLOSKY
EMAIL: USA@BC.COM    (ADD EMAIL)
STATUS: UNVERIFIED (0)

BALANCE | MANAGE | TRANSFER        VIEW LIMITS

┌─────────────────────────────────────┐
1402 ─────┤      U.S. DOLLAR (PRIMARY): $217.69 │
          │                     EUR +7.95      │
          │   CURRENT TOTAL IN U.S. DOLLARS: $263.08 │
          └─────────────────────────────────────┘

FORM A RETURN ON REST U.S. DOLLAR BALANCE!

RECENT ACTIVITY | ALL ACTIVITY | MY AUCTIONS   NEW!
[FILE][TYPE][TO/FROM][NAME/EMAIL][ AMOUNT ][   DATE   ][ STATUS ][ ACTION ]
[ ] |PAYMENT|FROM   |MEDOWARE   |EUR 50.00|SEP 29, 2002|COMPLETED|        |
[FILE SELECTED ITEMS] [FILE ALL]
```

*Fig. 14*

ALL ACTIVITY FROM AUG 30, 2002 TO SEP 29, 2002 - DISPLAYED MY HISTORY

| | TYPE | TO/FROM | NAME/EMAIL | STATUS | GROSS | FEE | NET AMOUNT |
|---|---|---|---|---|---|---|---|
| 3. | CURRENCY CONVERSION (CREDIT) | TO U.S. CALLER | FROM LURE | COMPLETED | $45.39 | $0.00 | $45.39 |
| 2. | CURRENCY CONVERSION (DEBIT) | FROM EURO | TO U.S. DOLLAR | COMPLETED | -EUR 47.95 | EUR 0.00 | -EUR 47.95 |
| 1. | PAYMENT | FROM | MEDOWARE | COMPLETED | EUR 50.00 | EUR 2.05 | EUR 47.95 |

| MY ACCOUNT | SEND MONEY | REQUEST MONEY | MERCHANT TOOLS | AU |

| OVERVIEW | ADD FUNDS | WITHDRAW | HISTORY | PROFILE |

PAYMENT RECEIVING PREFERENCES

BLOCK PAYMENTS FROM U.S. USERS WHO DO NOT PROVIDE A CONFIRMED ADDRESS:
- ○ YES
- ○ NO
- ● ASK ME

BLOCK PAYMENTS IF THEY ARE SENT TO ME IN A CURRENCY THAT I DO NOT HOLD: — 1602
- ○ YES
- ● NO, ACCEPT THEM AND CONVERT THEM TO U.S. DOLLARS
- ○ ASK ME

Fig. 16

```
                    ┌─────────────┬────────────┬───────────────┐
                    │ MY ACCOUNT  │ SEND MONEY │ REQUEST MONEY │
         ┌──────────┴─┬───────────┴┬───────────┴┬─────────┬────┴┐
         │ OVERVIEW   │ ADD FUNDS  │  WITHDRAW  │ HISTORY │  P  │
         ├────────────┴────────────┴────────────┴─────────┴─────┤
         │ PREMIER ACCOUNT OVERVIEW                             │
         │                                                      │
         │ NAME: SERAPHNE KOLOSKY                               │
         │ EMAIL: USA@BC.COM    (ADD EMAIL)                     │
         │ STATUS: UNVERIFIED (0)                               │
         │                                                      │
         │   BALANCE  |  MANAGE  |  TRANSFER      VIEW LIMITS   │
         │                                                      │
         │      ┌───────────────────────────────────────┐       │
         │      │ U.S. DOLLAR (PRIMARY):      $263.08   │       │
         │      │             EURO:         EUR 96.25   │       │
         │      │      POUND STERLING:       £193.00    │       │
         │      │ CURRENT TOTAL IN U.S. DOLLARS: $643.05│       │
         │      └───────────────────────────────────────┘       │
         │                                                      │
         │ EARN A RETURN ON YOUR U.S. DOLLAR BALANCE!           │
         └──────────────────────────────────────────────────────┘
```

*Fig. 17*

```
                                            LOG OUT | HELP
       ┌────────────┬────────────┬───────────────┬──────────────┬──────────────┐
       │ MY ACCOUNT │ SEND MONEY │ REQUEST MONEY │ MERCHANT TOOLS│ AUCTION TOOLS│
       ├────────────┴─┬──────────┴─┬──────────┬──┴──────┬───────┴┐
       │   OVERVIEW   │  ADD FUNDS │ WITHDRAW │ HISTORY │ PROFILE│
       ├──────────────┴────────────┴──────────┴─────────┴────────┴──────────┐
       │ TRANSFER FUNDS                                                     │
       ├────────────────────────────────────────────────────────────────────┤
       │ YOU MAY TRANSFER ALL OR A PORTION OF YOUR FUNDS FROM ONE CURRENCY  │
       │ BALANCE TO ANOTHER CURRENCY BALANCE.                               │
       │                                    BALANCES                       │
       │   TRANSFER: [ 50   ][ U.S. DOLLAR ▼]  ┌────────────────────────┐  │
       │         TO: [ EURO BALANCE        ▼]  │ U.S. DOLLAR:   $265.00 │  │
       │             [ CALCULATE ]             │        EURO: EUR 96.25 │  │
       │                                       │ POUND STERLING: £295.00│  │
       │                                       └────────────────────────┘  │
       ├────────────────────────────────────────────────────────────────────┤
       │ RESULTS:                                                           │
       │ THE CURRENT EXCHANGE RATE IS:                                      │
       │ 50.00 U.S. DOLLARS = 48.87 EUROS                                   │
       ├────────────────────────────────────────────────────────────────────┤
       │                                         [ TRANSFER ]  [ CANCEL ]   │
       └────────────────────────────────────────────────────────────────────┘
```

*Fig. 18*

```
                                                          LOG OUT | HELP
        [ MY ACCOUNT ][ SEND MONEY ][ REQUEST MONEY ][ MERCHANT TOOLS ][ AUCTION TOOLS ]
            OVERVIEW | ADD FUNDS | WITHDRAW | HISTORY | PROFILE
   MANAGE CURRENCY BALANCES                              BACK TO PROFILE SUMMARIES
   THE MANAGE CURRENCY TABLE DISPLAYS ALL OF THE CURRENCIES IN WHICH YOU MAY MAINTAIN A  [?]
   BALANCE.
```

| CURRENCY BALANCE | | STATUS | BALANCE |
|---|---|---|---|
| ● | U.S. DOLLAR | PRIMARY OPEN | $263.00 |
| ○ | EURO | OPEN | EUR 96.25 |
| ○ | POUND STERLING | OPEN | £193.00 |

[ OPEN BALANCE ] [ CLOSE BALANCE ] [ MAKE PRIMARY ]          [ TRANSFER ]

*Fig. 19*

```
        [ MY ACCOUNT ][ SEND MONEY ][ REQUEST MONEY ][ MERCHANT TOOLS ][ AUCTION TOOLS ]
            OVERVIEW | ADD FUNDS | WITHDRAW | HISTORY | PROFILE
   WITHDRAW FUNDS BY ELECTRONIC TRANSFER             SECURE TRANSACTION 🔒

IT USUALLY TAKES 3-4 BUSINESS DAYS TO TRANSFER FRUNDS FROM YOUR ACCOUNT TO YOUR
   BANK ACCOUNT, BUT MAY TAKE LONGER DEPENDING ON YOUR BANK'S POLICIES.

FROM THIS BALANCE: [ EUR 96.25            ▼ ]

AMOUNT:     [ 50                     ]

TO:    [ WELLS FARGO CHECKING (UNCONFIRMED) XXXXXX5867 ▼ ]

ADD BANK ACCOUNT

MULTI CURRENCY EXCHANGES BETWEEN PARTICIPANTS OF A NETWORK-BASED TRANSACTION FACILITY

RELATED APPLICATIONS

This application is a continuation of U.S. application Ser. No. 10/608,525, filed Jun. 26, 2003, now U.S. Pat. No. 7,742,985 entitled "Multicurrency Exchanges Between Participants of a Network-Based Transaction Facility," which is incorporated herein by reference in its entirety.

TECHNICAL FIELD

The present invention relates generally to the field of e-commerce and, more specifically, to facilitating online payment transactions in multiple currencies between participants of a network-based transaction facility.

BACKGROUND

Typically, an electronic payment system allows participants of a network-based transaction facility to collect payments online. For example, the payer may send money to the electronic payment system using a credit card or check, or funds in a payer account maintained by the electronic payment system. Recipients can store money in their accounts maintained by the electronic payment system, transfer the money to a separate bank account or have the electronic payment system cut them a check.

With the growth in international commerce, problems arise due to different monetary systems used in different countries. That is, money is generally expressed in different currencies in different countries and the value of the different currencies varies greatly.

Currency conversion is widely used to convert money from one currency into money of a different currency. However, currency conversion represents a significant economic risk to both buyers and sellers in international commerce. For example, when a buyer in the U.S. desires to buy a product in an online transaction facility from a seller in France, the buyer may use a credit card to pay the seller for the product. The credit card company may pay the seller in Euros, and then at an undetermined later date, it will bill an amount to the buyer in U.S. dollars. The amount billed to the buyer is determined by an exchange rate used at the time the credit card company settles the transaction. The time of this settlement is at the credit card company's discretion. The risk to the credit card company is minimal because the credit card company can settle the transaction when exchange rates are favorable. Thus, in this case, it is the buyer who bears the risk that the value of the buyer's currency will decline prior to this settlement.

In another example, a seller participating in an online transaction facility may decide to accept a different currency to be able to sell the product. In this case, the seller may later sell the currency to a currency trader, usually at a discount. The price the seller charges to the buyer who pays cash reflects both the cost of currency conversion and the risk that the rate used to establish the price of the product in a particular currency may have changed. This typically results in the buyer paying a higher price for the product and the seller incurring risk due to a possible change in currency exchange rates.

In yet another example, a buyer may convert from the native currency to a different second currency before the sale to be able to buy a product from a seller who only accepts payments in the second currency. In this case, the buyer can purchase goods at a price in the second currency, but cannot be certain of the value of the second currency relative to the buyer's native currency. Thus, the individual assumes the risk of devaluation of the second currency against the first currency. Further, the buyer bears the risk that the second currency may cease to be convertible into his native currency.

The above problems create inconvenience and uncertainty for participants in international commerce, thus discouraging the development of international commerce over electronic networks.

BRIEF DESCRIPTION OF THE DRAWINGS

The present invention is illustrated by way of example and not limitation in the figures of the accompanying drawings, in which like references indicate similar elements and in which:

FIG. 10 is a flow diagram of one embodiment of a method for facilitating multi currency payment transactions between participants of a network-based transaction facility;

FIGS. 10-20 are exemplary representations of various interfaces included in the sequence of interfaces shown in FIG. 8.

DETAILED DESCRIPTION

A method and apparatus for facilitating online payment transactions in multiple currencies between users over a communications network are described. In the following description, for purposes of explanation, numerous specific details are set forth in order to provide a thorough understanding of the present invention. It will be evident, however, to one skilled in the art that the present invention may be practiced without these specific details.

System for Processing Online Payment Transactions

Figure 1:
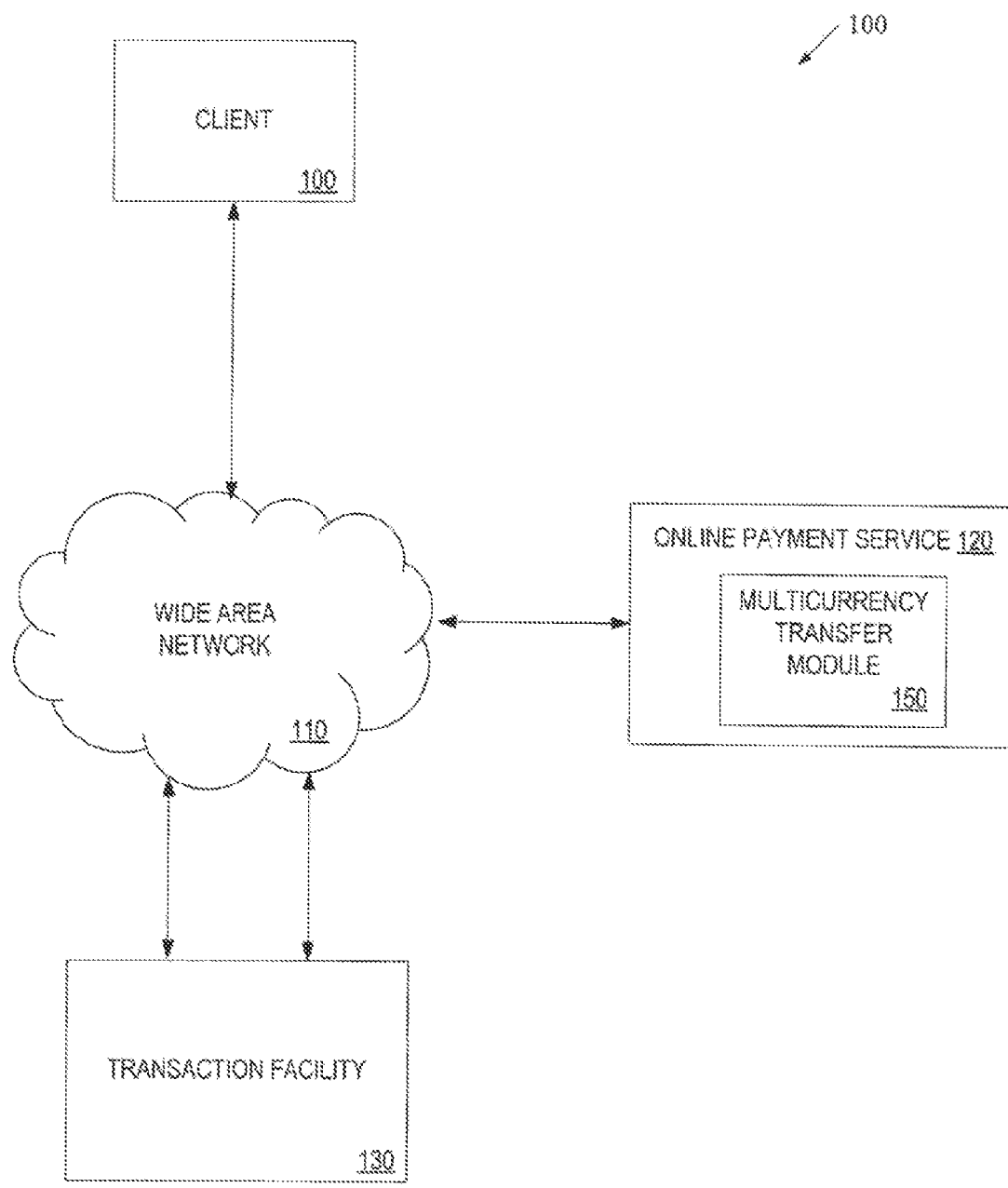
FIG. 1 is a block diagram of one embodiment of a system for processing online multi currency payment transactions between participants in a network-based transaction facility.

FIG. 1 is a block diagram of one embodiment of a system for processing online payment transactions in multiple currencies between participants in a network-based transaction facility. In this embodiment, a client 100 is coupled to a transaction facility 130 via a communications network, including a wide area network 110 such as, for example, the Internet. Other examples of networks that the client may utilize to access the transaction facility 130 include a local area network (LAN), a wireless network (e.g., a cellular network), or the Plain Old Telephone Service (POTS) network.

The client 100 represents a device that allows a user to participate in a transaction facility 130. The transaction facility 130 handles all transactions between various participants including the user of the client computer 100. In one embodiment, the transaction facility 130 may be an online auction facility represented by an auction web site visited by various participants including the user of the client computer 100. Alternatively, the transaction facility 130 may be an online retailer or wholesaler facility represented by a retailer or wholesaler web site visited by various buyers including the user of the client computer 100. In yet other embodiments, the transactions facility 130 may be any other online environment used by a participant to conduct business transactions.

The transaction facility 130 is coupled to an online payment service 120. In one embodiment, the transaction facility 130 is coupled to the online payment service 120 via a communications network such as, for example, an internal network, the wide area network 110, a wireless network (e.g., a cellular network), or the Plain Old Telephone Service (POTS) network. Alternatively, the online payment service 120 is integrated with the transaction facility 130 and it is a part of the transaction facility 130. The online payment service 120 is also coupled to the client 100 via any of the described above communications networks. The online payment service 120 is a service for enabling online payment transactions between participants of the transaction facility 130, including the user of the client computer 100.

In one embodiment, the online payment service 120 includes a multi-currency transfer module 150 that allows the participants to maintain account balances in different currencies and make online payments in different currencies in the course of business conducted in the transaction facility 130. The term "currency" as referred to herein may include, for example, denominations of script and coin that are issued by government authorities as a medium of exchange. In another example, a "currency" may also include a privately issued token that can be exchanged for another privately issued token or government script. For example, a company might create tokens in various denominations. This company issued "money" could be used by employees to purchase goods from sellers. In this case, an exchange rate might be provided to convert the company currency into currencies which are acceptable to merchants.

As will be discussed in more detail below, in one embodiment, the multi currency transfer module 150 allows the participants to make educated decisions as to which currency to choose for sending and receiving payments. In another embodiment, the multi currency module 150 provides the participants with a mechanism for managing their account balances in different currencies.

Figure 2:
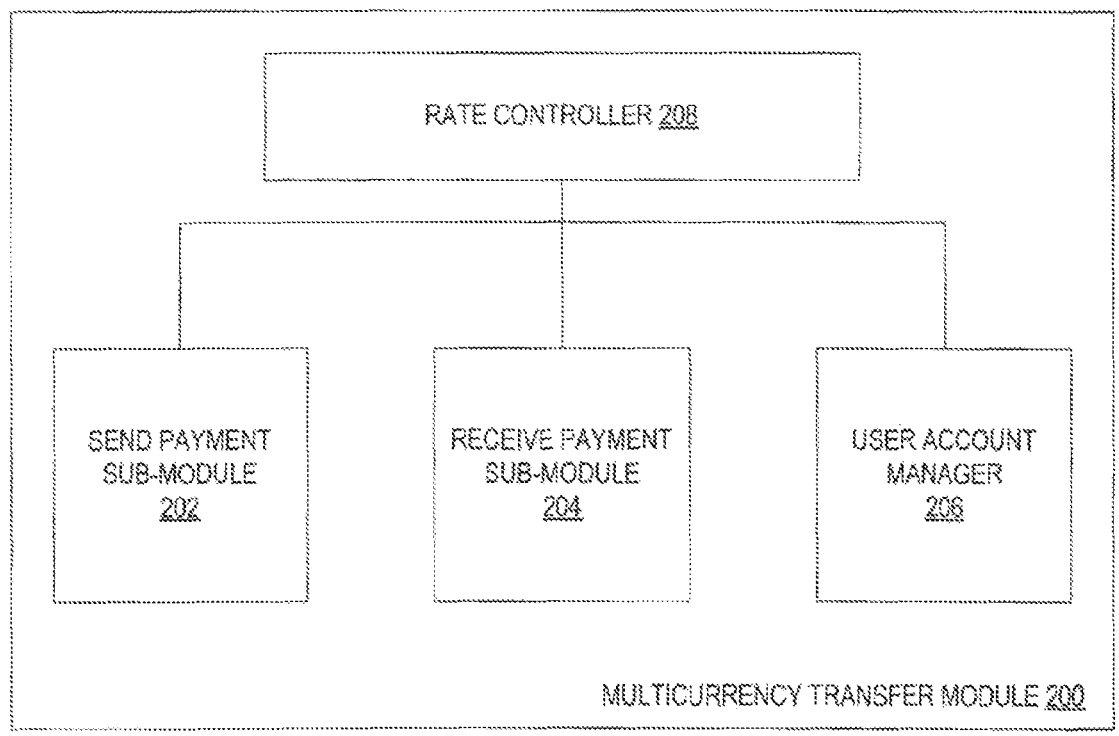
FIG. 2 is a block diagram of one embodiment of a multi-currency transfer module.

FIG. 2 is a block diagram of one embodiment of a multi-currency transfer module 200. The multicurrency transfer module 200 includes, in one embodiment, a send payment sub-module 202, a receive payment sub-module 204, a user account manager 206, and a rate controller 208.

In one embodiment, the send payment sub-module 202 is responsible for facilitating a sender selection of a currency in which a payment to a recipient is to be made, for funding the payment, for notifying a recipient about the payment, and for handling returned or denied payments. In one embodiment, if the sender does not hold an account balance in the currency that he or she selects for the payment, the send payment sub-module 202 is responsible for automatically converting funds from an existing sender balance in a different currency into the selected currency.

In one embodiment, the receive payment sub-module 204 is responsible for assisting a recipient in making a decision with respect to an acceptance of a sender payment in a specific currency, for converting the sender payment into a different currency if needed, and for notifying the sender about the recipient's decision.

In one embodiment, the user account manager 206 is responsible for allowing users to hold account balances in different currencies, for opening/removing currency balances within user accounts, and for performing transfers of funds between different currency balances within a user account.

In one embodiment, the rate controller 208 is responsible for periodically obtaining exchange rates from a third party system and using these rates to refresh rates stored in a database of the online payments service.

In one embodiment, the multi currency transfer module 200 also includes a request money sub-module that allows users to request money in any currency using a request money user interface with a list of currencies for user selection.

In one embodiment, the multicurrency transfer module 200 also includes a withdraw funds sub-module that allows users to withdraw money from any currency balance to a user bank account. If the withdrawal requires conversion, the relevant conversion data is presented to the user and the user is requested to confirm the final withdrawal.

Figure 3:
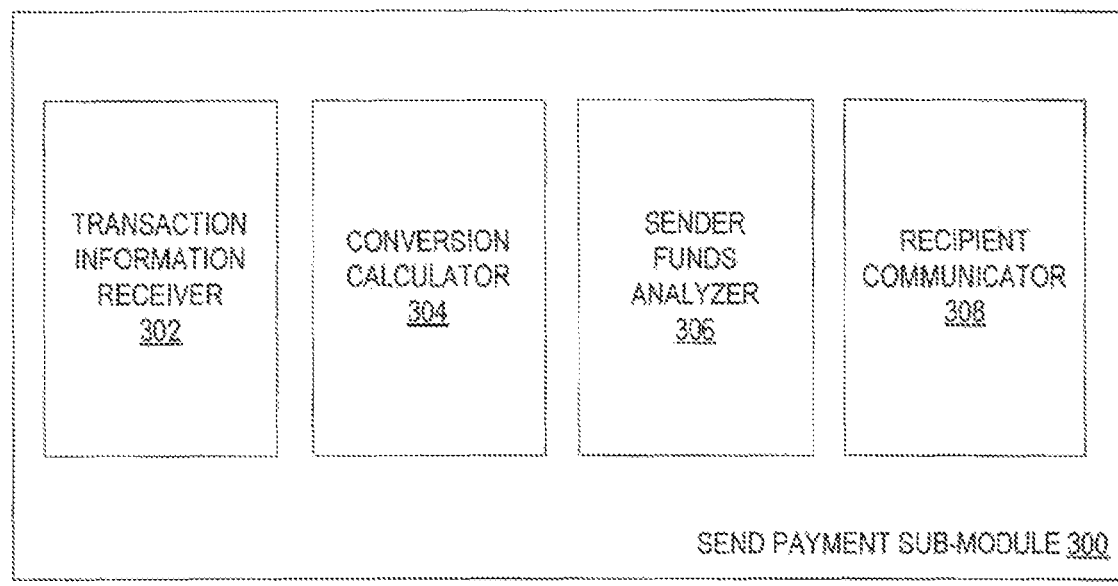
FIG. 3 is a block diagram of one embodiment of a send payment sub-module.

FIG. 3 is a block diagram of one embodiment of a send payment sub-module 300. The send payment sub-module 300 includes, in one embodiment, a transaction information receiver 302, a conversion calculator 304, a sender funds analyzer 306, and a recipient communicator 308.

The transaction information receiver 302 is responsible for communicating to a sender a user interface that facilitates user input of transaction information such as a recipient identifier (e.g., a recipient email address), a payment amount, a currency to be used for the payment, etc. In one embodiment, the user interface presents to the sender a list of currencies supported by the online payment system (e.g., U.S. dollars, Canadian dollars, Euros, pounds sterling, yen, etc.) and the sender is asked to select a specific currency from the list. The transaction information receiver 302 is further responsible for receiving transaction information entered by the sender via the user interface.

In one embodiment, if the currency selected by the sender for the payment is not a sender primary currency, the conversion calculator 304 is invoked. In another embodiment, the conversion calculator 304 is invoked only if the sender does not hold an account balance in the selected currency. Once invoked, the conversion calculator 304 is responsible for providing a current exchange rate between the sender-selected currency and the sender primary currency and for calculating an equivalent value in the sender primary currency for the payment amount. The primary currency may be, for example, a currency used in the majority of payment transactions that involved the sender. In another example, the primary currency is a currency that was specifically identified by the sender as primary. In yet another example, the primary currency may be a currency of a country in which the sender resides or a default currency provided by the online payment service 120.

The transaction information receiver 302 displays to the sender the conversion information provided by the conversion calculator 304 and requests the sender to confirm the payment in the selected currency. Once the sender sees the conversion information, the sender may decide that the current exchange rate for the selected currency is not favorable and select another currency. Alternatively, the sender may consider the current exchange rate as favorable and confirm the payment in the selected currency. In one embodiment, the sender may request, prior to confirming the payment, to view the history of currency conversion calculations from the sender's previous payment transactions to decide whether the current exchange rate is favorable.

The recipient communicator 308 is responsible for informing the recipient about the sender's payment in the selected currency, receiving data indicating whether the recipient decides to accept the payment in this currency, and communicating the recipient's decision to the sender. In one embodiment, if the recipient decides to deny the payment, the recipient communicator 308 displays to the sender a message offering to select a different currency.

The sender funds analyzer 306 is responsible for analyzing the sender's funds and determining how to fund the payment in the sender-selected currency. In one embodiment, if the sender holds an account balance in the selected currency, the sender funds analyzer 306 uses this account balance to fund the payment. Alternatively, if the sender does not hold an account balance in the selected currency, the sender funds analyzer 306 may use an account balance in the sender's primary currency to fund the payment. If the funds in the sender's primary balance are not enough to cover the payment, the sender funds analyzer 306 may ask the sender to specify an additional source for funding. This additional source may be, for example, a sender credit card, a sender bank account, a sender balance other then the primary balance, etc. In one embodiment, the sender is presented with relevant conversion information before requesting the sender's confirmation of any conversion that is necessary to fund the payment.

Figure 4:
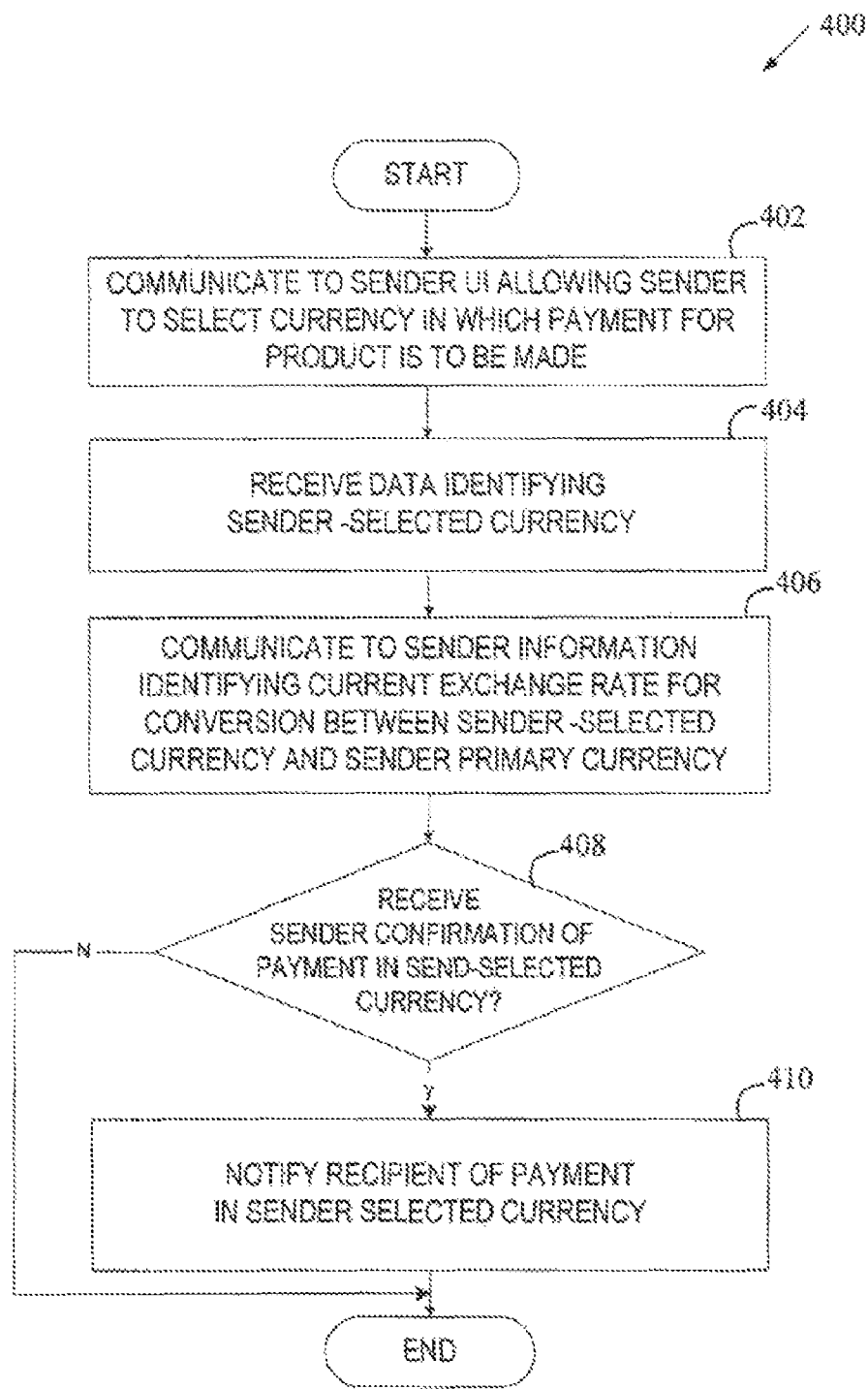
FIG. 4 is a flow diagram of one embodiment of a method for processing submissions of online multi currency payments.

FIG. 4 is a flow diagram of one embodiment of a method 400 for processing submissions of online multicurrency payments. The method 400 may be performed by processing logic, which may comprise hardware, software, or a combination of both. Processing logic may reside either in the online payment service 120, or partially or entirely in a separate device and/or system(s).

Referring to FIG. 4, the method 400 begins with processing logic communicating to a sender via a communications network a user interface that facilitates the sender input with respect to a desired currency in which a payment is to be made (processing block 402). In one embodiment, the user interface presents to the sender, for his or her selection, a list of currencies that are supported by the online payment service 120.

At processing block 404, processing logic receives data identifying the sender-selected currency from the sender via the communications network. In response, in one embodiment, processing logic determines whether the sender-selected currency is the sender's primary currency. If it is not, processing logic determines the current exchange rate for conversion between the sender-selected currency and the sender primary currency. In another embodiment, processing logic determines the current exchange rate only if the sender does not hold an account in the sender-selected currency.

Next, processing logic communicates to the sender via the communications network the current exchange rate for the conversion between the sender-selected currency and the sender primary currency (processing block 406). In one embodiment, processing logic also presents to the sender an equivalent value in the sender primary currency for the payment amount in the sender-selected currency. The presentation of the current conversion information (e.g., the exchange rate and the equivalent value) assist the sender in determining whether the terms for converting into the sender-selected currency are favorable at the present time. In addition, in one embodiment, the sender is provided with an opportunity to view the history of currency conversion calculations from previous transactions involving the sender to compare the current terms with prior terms.

Further, if processing logic receives from the sender a confirmation of the payment in the sender-selected currency (decision box 408), processing logic notifies the recipient about the payment in the sender selected currency (processing block 410).

Figure 5:
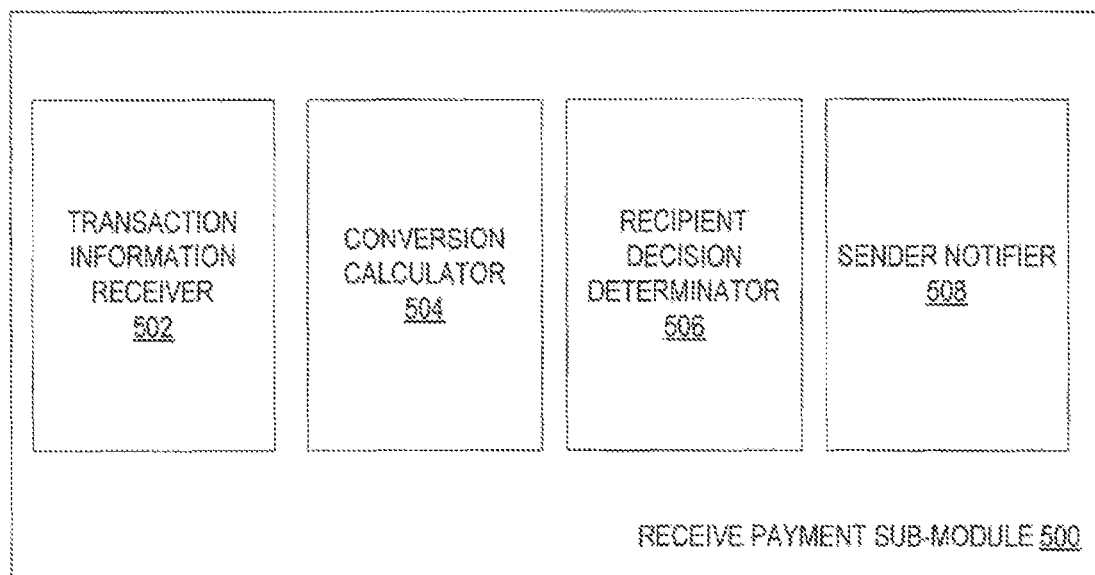
FIG. 5 is a block diagram of one embodiment of a receive payment sub-module.

FIG. 5 is a block diagram of one embodiment of a receive payment sub-module 500. The receive payment sub-module 500 includes, in one embodiment, a transaction information receiver 502, a conversion calculator 504, a recipient decision determinator 506, and a sender notifier 508.

The transaction information receiver 302 is responsible for receiving information about a sender's payment and communicating it to the recipient. The information about the sender payment may include, for example, the identifier of the sender (e.g., sender's name or email address), the payment amount, the sender-selected currency of the payment, etc.

In one embodiment, the transaction information receiver 502 is also responsible for determining whether the recipient holds an account balance in the sender-selected currency. If so, the transaction information receiver 502 is responsible for requesting a transfer of the payment amount to this account balance. If the recipient does not hold an account balance in the sender-selected currency, the conversion calculator 504 is invoked to provide a current exchange rate between the sender-selected currency and the recipient primary currency, and then the recipient decision determinator 506 communicates the current exchange rate to the recipient and requests the recipient's input with respect to an acceptance of the payment in the sender-selected currency. If the recipient accepts the payment in the sender-selected currency, the recipient decision determinator 506 requests to open a balance in the sender-selected currency within the recipient account. Alternatively, if the recipient accepts the payment in the sender-selected currency but also asks to convert it into the primary currency, the recipient decision determinator 506 performs the conversion and requests the addition of the resulting amount to the recipient's primary account balance.

In another embodiment, the recipient decision determinator 506 is responsible for requesting the recipient's input for every payment received from any sender. If the recipient specifies that he accepts the payment and wants to convert it into a different currency, the recipient decision determinator 506 is responsible for invoking the conversion calculator 504, communicating information provided by the conversion calculator 504 to the recipient, and obtaining the recipient's final confirmation of the acceptance of the payment.

In one embodiment, the conversion calculator 504 also calculates an equivalent value in a recipient primary currency (or some other currency specified by the recipient) for the payment amount in the sender-selected currency. The equivalent value is also presented to the recipient. Hence, the recipient is provided with information that can assist him in determining whether the acceptance of the payment in the sender-selected currency and/or conversion of the sender-selected currency into a different currency would be beneficial for the recipient at the present time. In addition, in one embodiment, the recipient is provided with an opportunity to view the history of currency conversion calculations from previous transactions involving the recipient to compare the current terms with prior terms.

Once the recipient specifies his decision, the sender notifier 506 notifies the sender about the recipient's decision.

Figure 6:
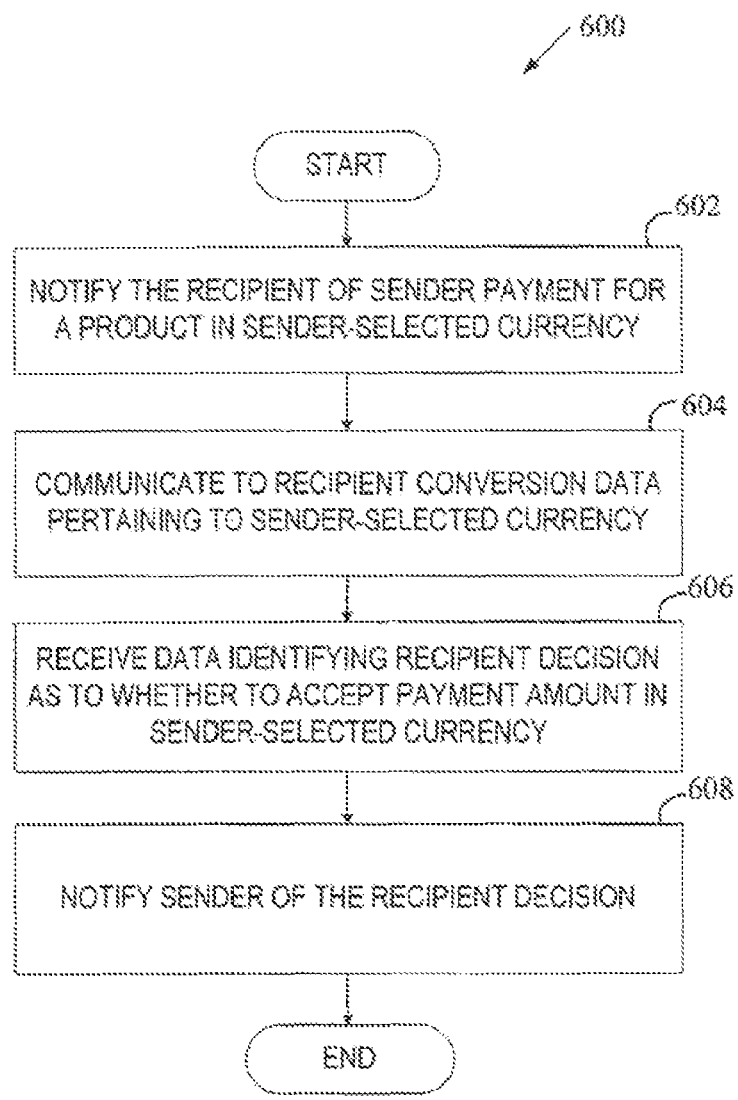
FIG. 6 is a flow diagram of one embodiment of a method for processing receipts of online multicurrency payments.

FIG. 6 is a flow diagram of one embodiment of a method 600 for processing receipts of online multi currency payments. The method 600 may be performed by processing logic, which may comprise hardware, software, or a combination of both. Processing logic may reside either in the online payment service 120, or partially or entirely in a separate device and/or system(s).

Referring to FIG. 6, the method 600 begins with processing logic communicating to a recipient via a communications network a notification of a sender payment in a sender-selected currency (processing block 602). At processing block 604, processing logic presents to the recipient via the communications network conversion data pertaining to a payment amount in the sender-selected currency. The conversion data may include an equivalent value in a recipient primary currency for the payment amount in the sender-selected currency. In one embodiment, the conversion data is communicated to the recipient if the recipient does not hold an account balance in the sender-selected currency. Alternatively, the conversion data is communicated to the recipient for every received payment.

In one embodiment, the notification about the sender payment and the conversion data is presented to the sender using a single user interface. In one embodiment, this user interface also allows the recipient to provide input for the recipient's decision with respect to an acceptance of the sender payment.

The presentation of the conversion data assists the recipient in determining which actions with respect to the payment in the sender-selected currency would be the most advantageous for the recipient at the present time. In one embodiment, the recipient may be also presented with a history of currency conversion calculations from previous transactions involving the recipient for comparison.

At processing block 606, processing logic receives from the recipient via the communications network data indicating the recipient's decision with respect to an acceptance of the payment in the sender-selected currency. In one embodiment, in which the recipient does not hold an account balance in the sender-selected currency, the recipient is provided with three decision options: (1) accept the payment and create a balance in the sender-selected currency within the recipient account, (2) accept the payment and convert it into the recipient's primary balance, and (3) deny the payment. If the recipient chooses the first option, processing logic requests a creation of a new balance within the recipient account and a transfer of the payment amount to this new balance. If the recipient chooses the second option, processing logic converts the payment amount into the recipient's primary balance and requests a transfer of the resulting amount to the recipient's primary balance.

In one embodiment, processing logic determines the recipient decision with respect to this payment based on payment receiving preferences previously provided by the recipient with respect to future payments in currencies for which the recipient does not hold a balance.

In one embodiment, processing logic assesses a receiving fee in the sender-selected currency if the recipient accepts the payment.

Afterwards, processing logic notifies the sender via the communications network of the recipient decision (processing block 608). In one embodiment, if the recipient denies the payment, processing logic presents to the sender a message offering the sender to select a different currency for the payment.

Figure 7:
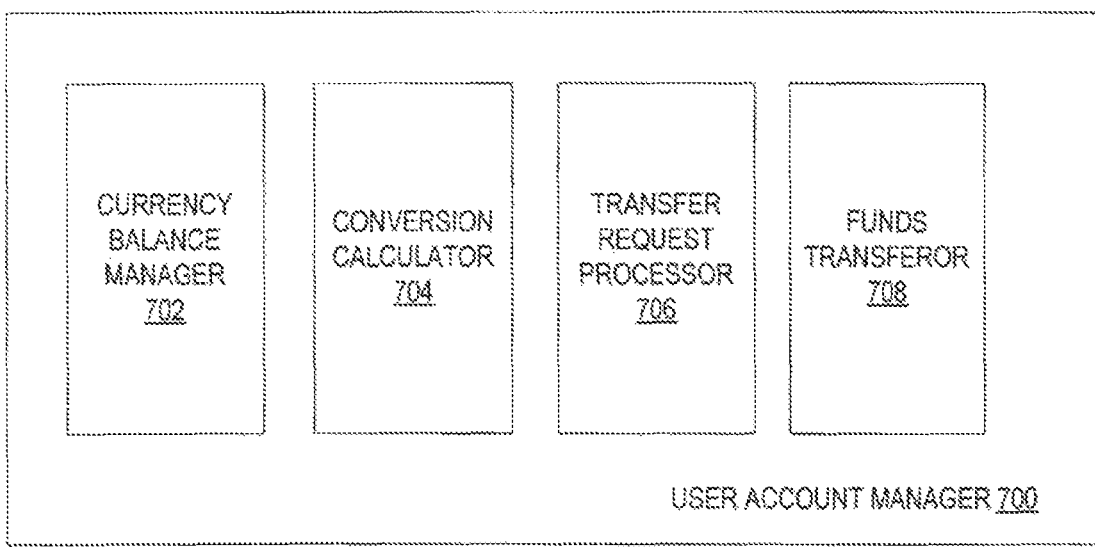
FIG. 7 is a block diagram of one embodiment of a user account manager.

FIG. 7 is a block diagram of one embodiment of a user account manager 700. The user account manager 700 includes, in one embodiment, a currency balance manager 702, a conversion calculator 704, a transfer request processor 706, and a funds transferor 708.

The currency balance manager 702 is responsible for maintaining balances in different currencies within a user account, opening new balances when needed and closing existing balances when requested by a user.

The conversion calculator 704 is responsible for providing current exchange rates and calculating amounts of potential and actual transfers.

The transfer request processor 706 is responsible for transferring funds between different currency balances within a user account. Prior to performing a transfer, the transfer request processor 706 displays conversion data provided by the conversion calculator 704 and then requests the user to confirm the transfer.

The funds transferor 708 is responsible for performing the transfer.

Figure 8:
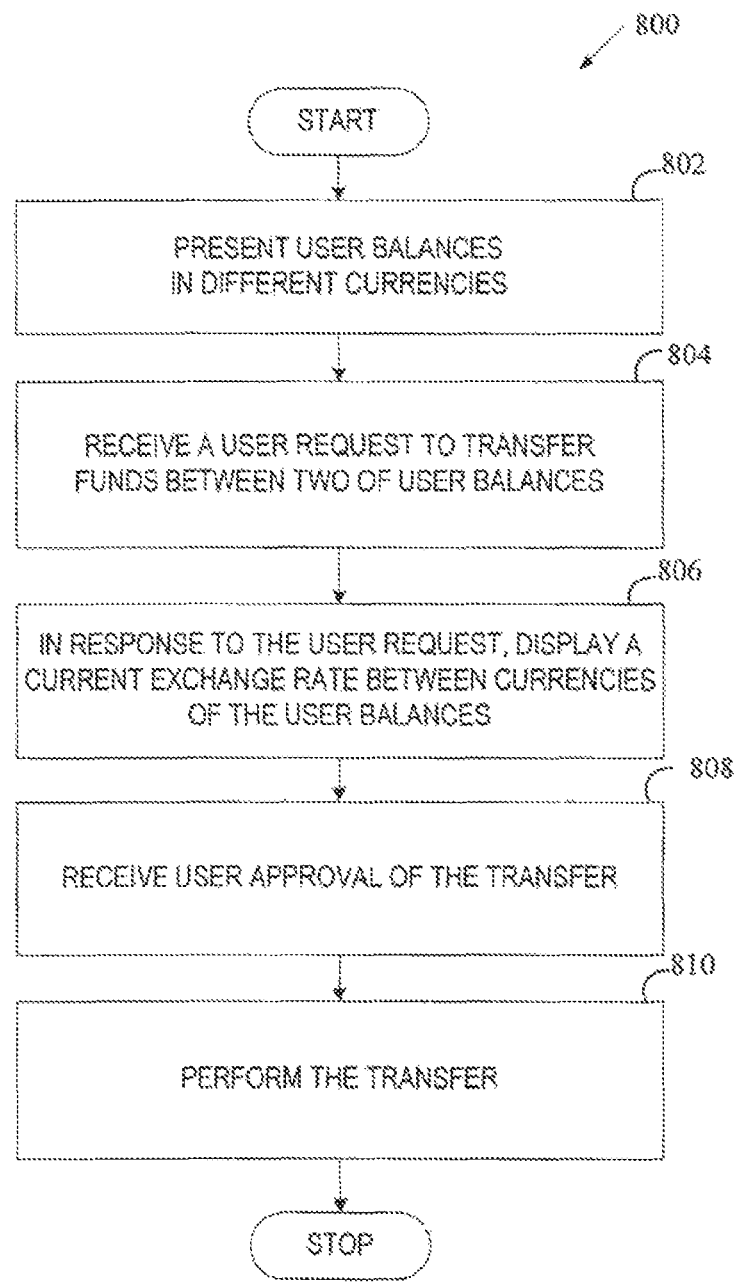
FIG. 8 is a flow diagram of one embodiment of a method for managing multicurrency balances of a user.

FIG. 8 is a flow diagram of one embodiment of a method 800 for managing multicurrency balances of a user. The method 800 may be performed by processing logic, which may comprise hardware, software, or a combination of both. Processing logic may reside either in the online payment service 120, or partially or entirely in a separate device and/or system(s).

Referring to FIG. 8, the method 800 begins with processing logic communicating to a recipient via a communications network information identifying a set of balances in different currencies within the user account (processing block 802). In one embodiment, the user is also presented with the combined total of all the balances in the user primary currency.

At processing block 804, processing logic receives from the user via the communications network data indicating a user desire to transfer funds between two currency balances. In response, processing logic presents to the user via the communications network data identifying a current exchange rate for conversion between currencies of the two balances (processing block 806).

Next, processing logic receives a user approval of the desired transfer (processing block 808) and performs the transfer (processing block 810).

As discussed above, a current exchange rate is periodically updated based on the rates obtained from a third party system. A third party may be a financial institution or any other organization that guarantees an exchange rate to the online payment service 120 during a predefined time interval. As a result, the online payment service 120 is not affected by any market fluctuations that may occur during this time interval and can provide its users with more up-to-date exchange rates.

Figure 9:
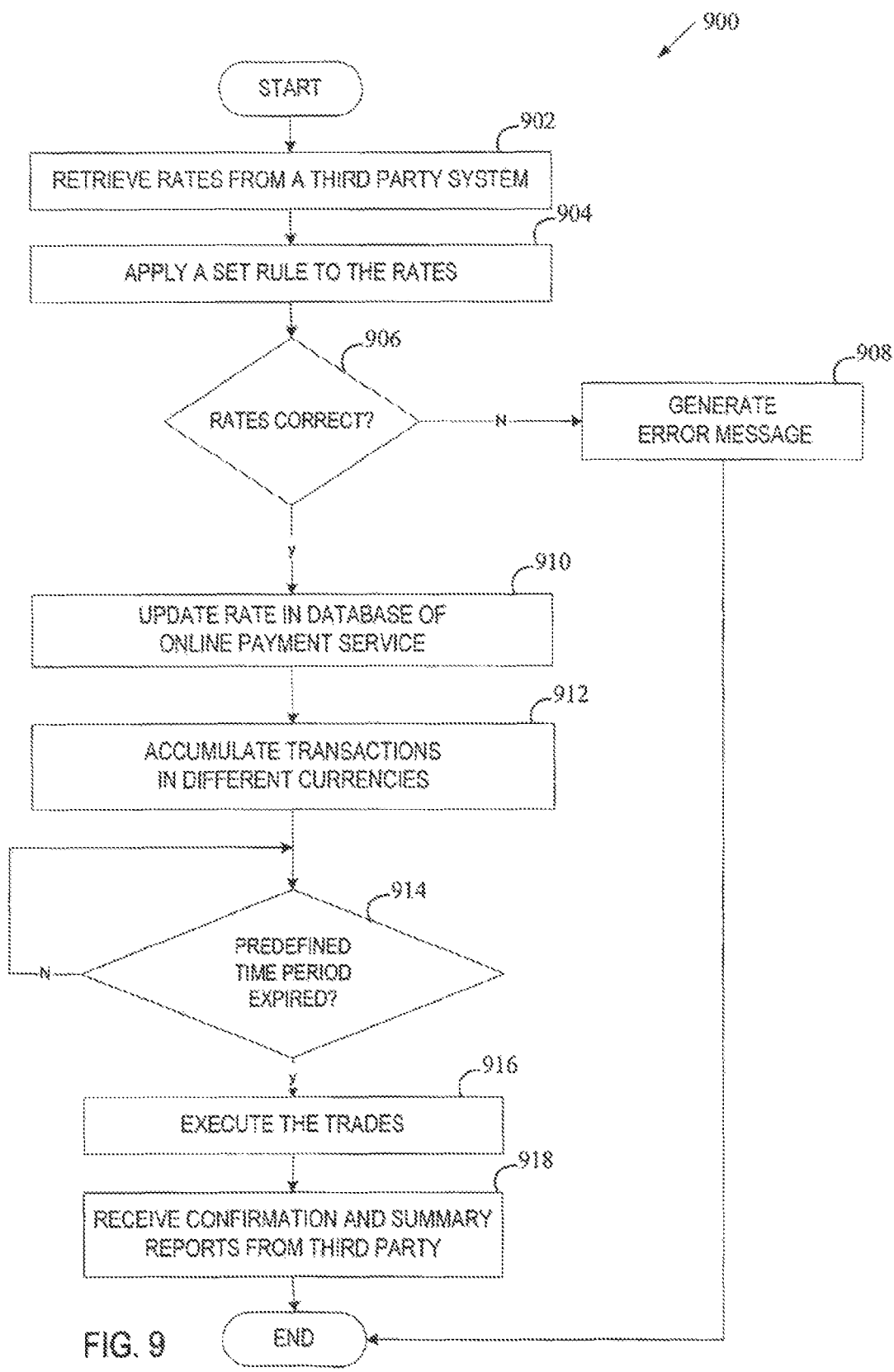
FIG. 9 is a flow diagram of one embodiment of a method for obtaining guaranteed exchange rates.

FIG. 9 is a flow diagram of one embodiment of a method 900 for obtaining guaranteed exchange rates. The method 900 may be performed by processing logic, which may comprise hardware, software, or a combination of both. Processing logic may reside either in the online payment service 120, or partially or entirely in a separate device and/or system(s).

Referring to FIG. 9, the method 900 begins with processing logic retrieving new exchange rates from a third party system (processing block 902). The new exchange rates have associated expiration dates and the online payment system is guaranteed the ability to trade against these rates within the specified window. In one embodiment, the new exchange rates are pulled via a client interface that interacts with a third party server. In one embodiment, the new exchange rates include a market exchange rate, a bid exchange rate and an ask exchange rate.

Next, processing logic applies a set of business rules to the new exchange rates (processing block 904). The set of business rules include a variety of checks (e.g., whether the new exchange rates have changed by more than 5% from the previous exchange rates) that are done to ensure that the rates are correct.

At decision box 906, processing logic determines whether the rates are correct. If not, processing logic generates an error message (processing block 908). If so, processing logic updates exchange rates currently stored in the live database of the online payment service with the new exchange rates (processing logic 910) and begins accumulating customer payment transactions in different currencies (processing block 912). When a predefined time period expires (decision box 914), processing logic requests the third party system to trade and settle the accumulated customer payment transactions (processing logic 916) and receives confirmation and summary reports once the trades are completed. In one embodiment, all transactions are funded and settled in a specific currency (e.g., U.S. dollars). In one embodiment, the trades are completed via a client interface that interacts with the third party server.

FIG. 10 is a flow diagram of one embodiment of a method 1000 for facilitating multi currency payment transactions between participants of a network-based transaction facility. The method 900 may be performed by processing logic, which may comprise hardware, software, or a combination of both. Processing logic may reside either in the online payment service 120, or partially or entirely in a separate device and/or system(s).

Referring to FIG. 10, the method 1000 begins with processing logic presenting to a sender a user interface that facilitates sender input of a specific currency for a payment (processing block 1002). Next, processing logic determines whether the sender-selected currency is a sender primary currency (decision box 1004). If so, the method 1000 proceeds directly to decision box 1008. If not, processing logic displays a current exchange rate for conversion between the sender-selected currency and the sender primary currency and an equivalent value in the sender primary currency (processing block 1006) and requests the sender to confirm the payment.

If the sender confirms the payment (decision box 1008), processing logic notifies the recipient about the payment in the sender-selected currency and presents to the recipient an equivalent value in the recipient's primary currency for the payment amount in the sender-selected currency (processing block 1010).

If the recipient denies the payment (decision box 1012), processing logic presents to the sender a message offering the sender to select a different currency.

If the recipient accepts the payment, processing logic funds the payment using one or more payment instruments of the sender (processing block 1013). In one embodiment, if the sender has an account balance in the sender-selected currency, processing logic funds the payment using this account balance. If the sender does not have such account balance, processing logic funds the payment using the sender primary account balance. If the primary account balance does not cover the payment, processing logic may use a sender credit card, a sender bank account, or other account balances within the sender account to fund the payment.

Further, if the recipient accepts the payment, processing logic assesses a receiving fee in the sender-selected currency (processing block 1014) and determines whether the recipient holds an account balance in the sender-selected currency (decision box 1015). If so, processing logic adds the payment to this balance (processing block 1016). If not, processing logic determines whether the recipient requested conversion of the accepted payment into the recipient primary currency (decision box 1018). If so, processing logic performs the conversion (processing block 1020), shows transaction history for the conversion (processing block 1022), and transfers the payment amount to the primary balance.

If the recipient did not request conversion, processing logic creates a new currency balance (processing block 1024), transfers the payment amount to the new currency balance (processing block 1026), and presents a list of existing currency balances with the total amount value to the recipient (processing block 1028).

In one embodiment, if processing logic receives a request to return the payment to the sender, processing logic performs the return in the currency in which the payment was originated using an original exchange rate.

Functions of the online payment service 120 pertaining to multi currency payments will now be described within the context of user interfaces, according to one embodiment of the present invention. Exemplary representations of the various interfaces are shown in FIGS. 11-20. While the exemplary interfaces are described as comprising markup language documents displayed by a browser, it will be appreciated that the described interfaces could comprise user interfaces presented by any Windows® client application or stand-alone application, and need not necessarily comprise markup language documents.

FIG. 11 illustrates an exemplary send money interface that enables a sender to specify which currency 1102 is to be used for a payment.

FIG. 12 illustrates an exemplary check payment details interface that displays a current exchange rate 1204 for conversion between the sender-selected currency and a sender primary currency and an equivalent value 1202 in the sender primary currency. The user interface also includes a send money button 1206 requesting the sender to confirm the payment.

FIG. 13 is an exemplary receive money interface that notifies a recipient about the sender's payment and requests him to specify his decision with respect to the payment. The receive money interface presents to the recipient the payment amount 1304 in the sender-selected currency and an equivalent value 1302 in the recipient primary currency.

FIG. 14 is an exemplary account overview interface which is presented if the recipient chose to accept the payment in the sender-selected currency. A new balance 1402 created in response to the recipient's acceptance is shown in the Balance box. The balance 1402 reflects an assessment of a receiving fee.

FIG. 15 is an exemplary transaction history interface that is presented in response to the recipient's request to accept the payment in the sender-selected currency and to convert it into the recipient primary currency. The transaction history includes 3 records: (1) the payment received in its original currency, (2) the conversion from the original currency, and (3) the conversion to the recipient's primary currency.

FIG. 16 is an exemplary payment receiving preferences interface that includes information 1602 specifying how the recipient wishes to handle payments that are sent in currencies that the recipient does not hold. As shown, the recipient can request that such payments be blocked, accepted and converted into a primary currency, or be asked about.

FIG. 17 is an exemplary account overview interface that identifies various currency balances within a user account and provides a total amount of all the balances in the primary currency.

FIG. 18 is an exemplary transfer funds interface that allows a user to transfer funds from one account balance to another. The transfer funds interface also presents a current exchange rate for the conversion, a resulting amount in the desired conversion, and a transfer button to confirm the transfer.

FIG. 19 is an exemplary manage currency interface that displays all the currency in which the user may maintain a balance, allows the user to open a new balance, remove an existing balance and make a certain balance primary.

FIG. 20 is an exemplary withdraw funds interface that allows a user to withdraw funds from any of his currency balances. Before completing the deposit, the funds are converted into the currency of the user bank account and the results are displayed to the user In summary, it will be appreciated that the above described interfaces, and underlying technologies, provide a convenient vehicle for facilitating multicurrency payment transactions in a transaction facility.

Figure 21:
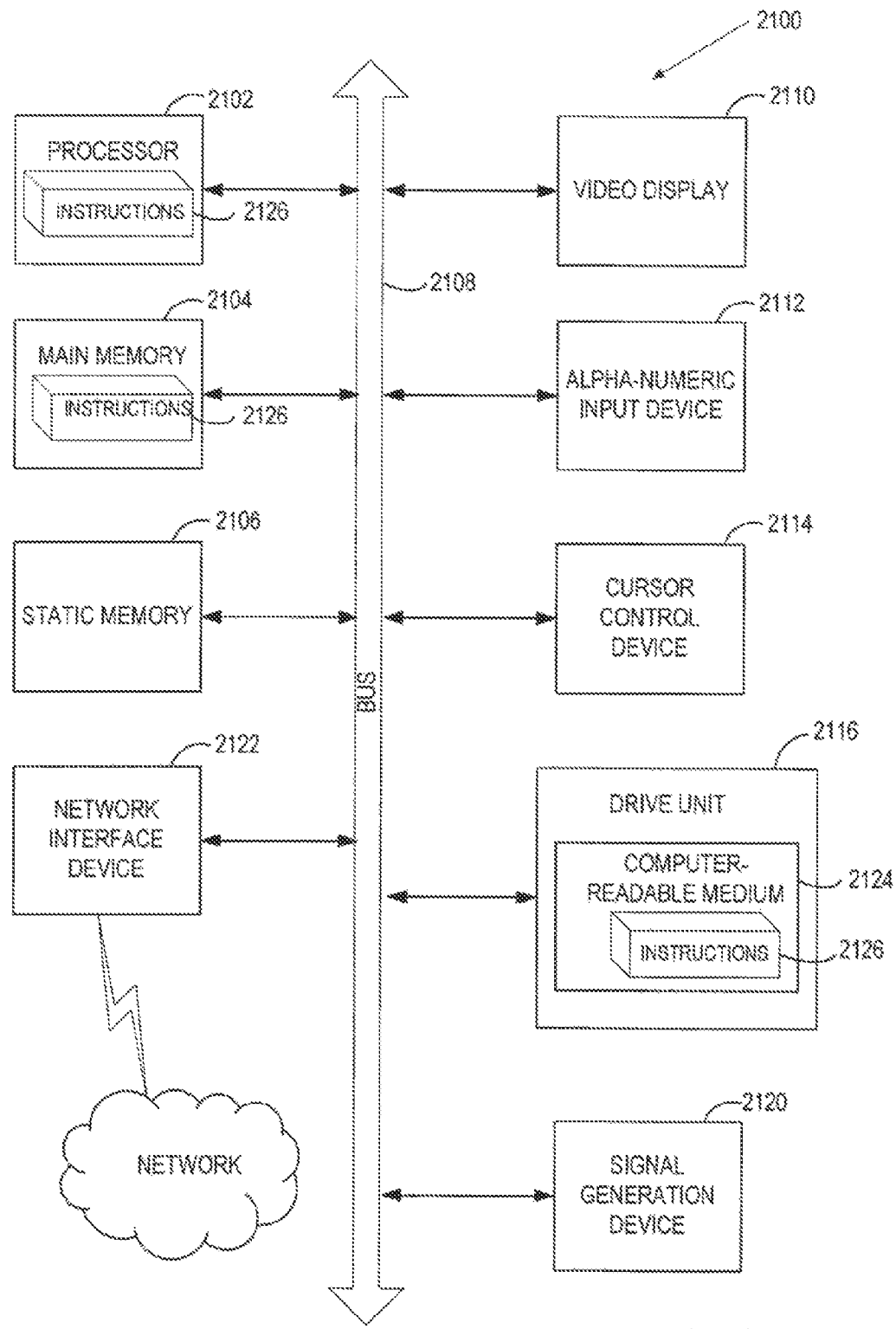
FIG. 21 is a block diagram of one embodiment of a computer system.

FIG. 21 shows a diagrammatic representation of machine in the exemplary form of a computer system 2100 within which a set of instructions, for causing the machine to perform anyone of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alpha-numeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying anyone, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform anyone of the methodologies of the present invention. The term "computer-readable medium" shall accordingly be taken to included, but not be limited to, solid-state memories, optical and magnetic disks, and carrier wave signals.

Thus, a method and apparatus for facilitating online payment transactions in a network-based transaction facility using multiple payment instruments have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   storing an exchange rate associated with a currency in a database, the exchange rate being received from a third party system and being associated with a rate expiration date;
   storing one or more payment transactions conducted in the currency;
   determining, using one or more processors, that a determinable time period has expired, the determinable time period set to expire prior to the rate expiration date; and
   in response to the determining that the determinable time period has expired, sending instructions to the third party system to execute trades on the one or more payment transactions using the stored exchange rate.

2. The method of claim 1, further comprising retrieving an updated exchange rate from the third party system.

3. The method of claim 2, wherein the retrieving occurs at predefined time intervals.

4. The method of claim 2, further comprising applying a set of rules to the retrieved exchange rate to determine if the retrieved exchange rate is correct.

5. The method of claim 4, further comprising updating the exchange rate stored in the database with the retrieved exchange rate if the retrieved exchange rate is correct.

6. The method of claim 4, further comprising generating an error message if the retrieved exchange rate is incorrect.

7. The method of claim 1, further comprising receiving a summary report from the third party system once the trades are executed by the third party system.

8. The method of claim 1, wherein the payment transaction comprises a payment from a sender in a sender-selected currency to a recipient, the payment transaction requiring a currency exchange into a currency associated with the recipient.

9. The method of claim 1, wherein the exchange rate is one or more of a market exchange rate, a bid exchange rate, or an ask exchange rate.

10. A system comprising:
    a database to store an exchange rate associated with a currency in a database, the exchange rate being received from a third party system and being associated with a rate expiration date; and
    one or more processors to
      store one or more payment transactions conducted in the currency;
      determine that a determinable time period has expired, the determinable time period set to expire prior to the rate expiration date; and
      in response to the determinable time period expiring, send instructions to the third party system to execute trades on the one or more payment transactions using the stored exchange rate.

11. The system of claim 10, further comprising a rate controller to retrieve an updated exchange rate from the third party system.

12. The system of claim 11, wherein the one or more processors is further to apply a set of rules to the retrieved exchange rate to determine if the retrieved exchange rate is correct.

13. The system of claim 12, wherein the rate controller is further to update the exchange rate stored in the database with the retrieved exchange rate if the retrieved exchange rate is correct.

14. The system of claim 10, wherein the payment transaction comprises a payment from a sender in a sender-selected currency to a recipient, the payment transaction requiring a currency exchange into a currency associated with the recipient.

15. The system of claim 10, wherein the exchange rate is one or more of a market exchange rate, a bid exchange rate, or an ask exchange rate.

16. A non-transitory computer readable medium in communication with at least one processor, the machine-readable storage medium storing instructions which, when executed by the at least one processor, provides a method comprising:

storing an exchange rate associated with a currency in a database, the exchange rate being received from a third party system and being associated with a rate expiration date;

storing one or more payment transactions conducted in the currency;

determining, using one or more processors, that a determinable time period has expired, the determinable time period set to expire prior to the rate expiration date; and in response to the determining that the determinable time period has expired, sending instructions to the third party system to execute trades on the one or more payment transactions using the stored exchange rate.

17. The non-transitory computer readable medium of claim 16, further comprising retrieving an updated exchange rate from the third party system.

18. The non-transitory computer readable medium of claim 17, further comprising applying a set of rules to the retrieved exchange rate to determine if the retrieved exchange rate is correct, and updating the exchange rate stored in the database with the retrieved exchange rate if the retrieved exchange rate is correct.

19. The non-transitory computer readable medium of claim 16, wherein the payment transaction comprises a payment from a sender in a sender-selected currency to a recipient, the payment transaction requiring a currency exchange into a currency associated with the recipient.

20. The non-transitory computer readable medium of claim 16, wherein the determinable time period is a time period during which the stored currency exchange rate is guaranteed by the third party system.

\* \* \* \* \*

UNITED STATES PATENT AND TRADEMARK OFFICE
CERTIFICATE OF CORRECTION

| | |
|---|---|
| PATENT NO. | : 8,055,582 B2 |
| APPLICATION NO. | : 12/818935 |
| DATED | : November 8, 2011 |
| INVENTOR(S) | : Digrigoli et al. |

It is certified that error appears in the above-identified patent and that said Letters Patent is hereby corrected as shown below:

On Title Page 3, under "Foreign Patent Documents", in column 2, line 47, delete "2/2002" and insert -- 1/2002 --, therefor.

On Title Page 3, under "Foreign Patent Documents", in column 2, line 51, delete "6/2002" and insert -- 5/2003 --, therefor.

On Title Page 4, under "Foreign Patent Documents", in column 2, line 26, delete "Dec. 14, 2007"," and insert -- Dec. 14, 2004", --, therefor.

On Title Page 4, under "Foreign Patent Documents", in column 2, line 53, delete "Jul. 2, 20008"," and insert -- Jul. 2, 2008", --, therefor.

On Title Page 5, under "Foreign Patent Documents", in column 2, line 38, delete "Marker"," and insert -- Market", --, therefor.

On Sheet 4 of 15, Reference Numeral 408, Figure 4, line 3, delete "SEND-SELECTED" and insert -- SENDER-SELECTED --, therefor.

On Sheet 9 of 15, Reference Numeral 1028, Figure 10, line 1, delete "START" and insert -- STOP --, therefor.

In column 2, line 41, delete "FIGS. 10-20" and insert -- FIGS. 11-20 --, therefor.

Signed and Sealed this
Seventeenth Day of January, 2012

David J. Kappos
*Director of the United States Patent and Trademark Office*